United States Patent
Back et al.

(10) Patent No.: US 12,459,857 B2
(45) Date of Patent: Nov. 4, 2025

(54) ANTIMICROBIAL COATING

(71) Applicant: PILKINGTON TECHNOLOGY MANAGEMENT LIMITED, Argyll Scotland (GB)

(72) Inventors: Rory Back, Liverpool (GB); Simon Paul Oliver, Chester (GB); Luz Romero, Liverpool (GB); Simon Jeffreys, Liverpool (GB); Andrew Oliver Smith, St. Helens (GB)

(73) Assignee: Pilkington Technology Management Limited, Oban (GB)

( * ) Notice: Subject to any disclaimer, the term of this patent is extended or adjusted under 35 U.S.C. 154(b) by 631 days.

(21) Appl. No.: 17/437,487

(22) PCT Filed: Mar. 16, 2020

(86) PCT No.: PCT/GB2020/050672
§ 371 (c)(1),
(2) Date: Sep. 9, 2021

(87) PCT Pub. No.: WO2020/183204
PCT Pub. Date: Sep. 17, 2020

(65) Prior Publication Data
US 2022/0144694 A1    May 12, 2022

(30) Foreign Application Priority Data
Mar. 14, 2019    (GB) .................................... 1903507

(51) Int. Cl.
*B05D 7/00*    (2006.01)
*C03C 17/00*    (2006.01)

(52) U.S. Cl.
CPC ........ *C03C 17/007* (2013.01); *C03C 2204/02* (2013.01); *C03C 2217/445* (2013.01);
(Continued)

(58) Field of Classification Search
CPC ...................................................... B05D 7/00
See application file for complete search history.

(56) References Cited

U.S. PATENT DOCUMENTS

| 6,013,372 A | 1/2000 | Hayakawa et al. |
| 9,028,962 B2 | 5/2015 | Borrelli et al. |

(Continued)

FOREIGN PATENT DOCUMENTS

| CN | 102816466 A | 12/2012 |
| CN | 104854196 A | 8/2015 |

(Continued)

OTHER PUBLICATIONS

Gregor Grass et al., Metallic Copper as an Antimicrobial Surface, Applied and Environmental Microbiology, Mar. 2011, pp. 1541-1547, vol. 77, No. 5, American Society for Microbiology.

(Continued)

*Primary Examiner* — Gordon Baldwin
*Assistant Examiner* — Mohammad Mayy
(74) *Attorney, Agent, or Firm* — Marshall & Melhor, LLC

(57) ABSTRACT

The present invention relates to a process for producing an antimicrobial coating on a glass substrate, an antimicrobial coated glass substrate prepared by the process and use thereof, the process comprising the steps of: i) providing a glass substrate having a first surface and a second surface; ii) providing a silicon containing solution and a particle containing solution; iii) mixing together the silicon containing solution and the particle containing solution to form a silica coating composition; iv) contacting at least said first surface of the substrate with the silica coating composition to deposit a layer of silica on the glass substrate; and iv) curing the silica coating composition deposited on the glass substrate to form a silica matrix coating layer, wherein the (Continued)

particles are deposited on and/or within the silica matrix coating layer wherein the particles are deposited on and/or within the silica matrix coating layer in an amount of from 0.1 to 20% by weight.

17 Claims, 7 Drawing Sheets

(52) U.S. Cl.
CPC .. *C03C 2217/478* (2013.01); *C03C 2217/479* (2013.01); *C03C 2217/70* (2013.01); *C03C 2218/112* (2013.01); *C03C 2218/118* (2013.01)

(56) References Cited

U.S. PATENT DOCUMENTS

| | | | |
|---|---|---|---|
| 9,439,439 B2 | 9/2016 | Borrelli et al. | |
| 10,364,181 B2 | 7/2019 | Borrellli et al. | |
| 10,981,825 B2 | 4/2021 | Borrelli et al. | |
| 11,059,741 B2 | 7/2021 | Li et al. | |
| 2004/0052965 A1* | 3/2004 | Kranovich | A01N 59/16 427/508 |
| 2005/0031703 A1 | 2/2005 | Beier et al. | |
| 2010/0015193 A1 | 1/2010 | Inaoka et al. | |
| 2016/0250661 A1* | 9/2016 | Miller | B05D 7/222 427/554 |

FOREIGN PATENT DOCUMENTS

| | | | |
|---|---|---|---|
| CN | 105482536 A | 4/2016 | |
| CN | 109534687 A | 3/2019 | |
| DE | 202005006784 U1 | 9/2005 | |
| EP | 0989166 A1 | 3/2000 | |
| EP | 3138880 A1 | 3/2017 | |
| JP | 2005119026 A | 5/2005 | |
| JP | 2014000697 A | 1/2014 | |
| JP | 2016173499 A | 9/2016 | |
| KR | 20130077630 A | 7/2013 | |
| KR | 20180040554 A * | 4/2018 | |
| WO | WO/03062163 A2 | 7/2003 | |
| WO | WO/2005/005151 A1 | 12/2005 | |
| WO | WO/2009/098655 A2 | 8/2009 | |
| WO | WO-2016028554 A1 * | 2/2016 | ........... C03C 17/007 |
| WO | WO/2017/165369 A1 | 9/2017 | |

OTHER PUBLICATIONS

European Patent Office, International Search Report with Written Opinion, issued in PCT/GB2020/050672, May 14, 2020, 12 pages, European Patent Office, Rijswijk, Netherlands.
UK Intellectual Property Office, Search Report issued in GB1903507. 0, Sep. 27, 2019, 2 pages, Intellecutal Property Office, Newport, South Wales.
China National Intellectual Property Administration, Office Action in Application No. CN202080029705.X dated Apr. 4, 2022, 7 pages.

* cited by examiner

ANTIMICROBIAL COATING

BACKGROUND OF THE INVENTION

The present invention relates to a process for producing an antimicrobial coating on a substrate, to antimicrobial coated substrates and to the use of such antimicrobial coated substrates in a range of applications.

More specifically, the present invention relates to a process for producing an antimicrobial coating on a glass substrate and to glass substrates with antimicrobial coatings on at least one surface thereof. The invention also relates to antimicrobial articles comprising antimicrobial coated glass substrates prepared in accordance with the present invention such as for example but not limited to: architectural and automotive glazings, splash-backs, furniture, bottles, wall coverings and touchscreens.

As the extent to which electronic devices are used in the world increases, so the presence of micro-organisms which may reside on a screen surface also increases, and therefore, the potential transfer of micro-organisms from one individual to another. Indeed, touch screens located for example in shops and supermarkets may have hundreds of individuals per hour using the touch screen terminal and potentially spreading micro-organisms which may be in the form of bacteria, fungi, yeasts and viruses from one user to another.

In addition, as the threat of resistance to certain bacterial strains increases, and as epidemics arise from the transmission of some viruses, there is an ever-increasing need for individual glass substrates no matter the device or application, to be able to halt the spread of micro-organisms.

It has been known for some time that microorganisms including bacteria, yeasts and viruses may be killed if brought into contact with a metallic surface. Indeed, in an attempt to stem the spread of microorganisms in nosocomial environments, copper has been used on surfaces such as door handles, bathroom fixtures, and beds. (*Applied and Environmental microbiology* 2011, March, 77(5), 1541-1547).

However, the ability to incorporate antimicrobial properties into surfaces which are required to remain transparent to a required standard such as windows and doors and which are also resistant to for example wear and scratching has proved difficult. This is because, not only it is difficult to impart lasting antimicrobial activity to glass substrates, but also, any coating applied to a glass substrate which provides antimicrobial activity must still provide the required parameters of a glazing whilst retaining a pleasing aesthetic appearance at an acceptable cost.

Attempts have been made to impart antimicrobial activity to a substrate surface. For example, in WO 2009/098655 there is described a method for conferring antibacterial properties to a substrate which comprises coating said substrate with a silver film by radio-frequency sputtering. However, the document is silent with respect to the properties of the glass substrate after treatment.

KR 20130077630 A, discloses the dispersion of nano-metal ions in a silica sol-gel for anti-fingerprint and anti-bacterial purposes. However, there is no consideration given to copper particles and instead, focuses on the production of nano-metal ions through the reaction of a strong metal salt, with a focus on silver.

Likewise, CN109534687 describes a process to provide a silica based sol-gel with incorporated metal ions, preferably silver, used to provide an antimicrobial function.

US 2017/0036949 describes silver nitrate which is incorporated into an alkali aluminosilicate glass at temperatures between 320 and 620 degrees Celsius to provide a coating with antimicrobial function.

U.S. Pat. No. 9,028,962 B2 discloses a complex, multi-stage, process whereby copper oxide particles are applied to a transparent substrate. The glass substrate is subjected to ion-exchange either before or after application of the particles to chemically strengthen the glass followed by reducing the copper oxide particles. The antimicrobial glasses are further coated with a fluorosilane layer.

In WO 2005115151 there is disclosed a functional sol-gel coating agent which comprises a nano-particulate additive and which is said to have both an antimicrobial function and a decorative function as a result of the surface of the particle being modified by attachment of a dispersing aid and/or an adhesion promotor in the formed of functional silanes, that is, oligomers with a high OH group content.

Likewise, in JP 2005119026 there is described a substrate which provides antibacterial and anti-staining properties at the same time by way of a film comprising substituted siloxane molecules with surface hydroxyl groups on the entire surface of the substrate, the film further containing particles of silver.

US 2010/0015193 discloses a substrate with a plurality of antibacterial metal islands formed on the surface of the substrate and exposed to an external atmosphere with a view to forming a resistant coating. The average contact angle value between the substrate and the respective antibacterial metal islands is 90 degrees or less, when measured with a scanning electron microscope. The antibacterial metal islands are disposed by sputtering in an inert gas atmosphere.

DE 202005006784 generally describes articles such as doors, windows and/or inner linings for air conditioners or refrigerators which are suggested to be coated with a transparent, porous sol-gel-layer on at least a part of the surface, wherein the sol-gel layer comprises a matrix of organo-modified siloxanes with one or more alkyl groups and which is doped with at least one antimicrobially effective substance/compound. Unfortunately, no antimicrobial test data are provided in support.

However, none of the prior art documents described above detail a process according to the present invention, which is able to provide an antimicrobial coating on a substrate with the required microbial resistance and optical properties, as well as wear and scratch resistance, to a level required of glass substrates and glazings used in the glass industry at reasonable cost, and which may be used for example in locations where the glass or glazings experience extensive public contact.

Therefore, there exists the need for a glass substrate to which has been applied a transparent coating which is able to reduce growth and transmission of microbial pathogens, whilst maintaining optical performance and mechanical durability at reasonable cost.

The anti-microbial coated glass substrates prepared in accordance with the present invention may be used for example in but not limited to, automotive glazings and architectural glazings including commercial and residential applications as well as in food and healthcare applications. The present invention may also find application in for example but not limited to, electronic devices, such as touch screens, mobile phones, laptop computers, book readers, video gaming devices, and automated teller machines. Indeed, the present invention is applicable to any application or situation where a glass substrate is used and may be touched, or where information displayed on a glass screen is retrieved by touch.

In addition, the anti-microbial coatings prepared in accordance with the present invention may be used for instance with coated and uncoated substrates, for example, glass substrates such as but not limited to float glass coated using chemical vapour deposition (CVD) and/or physical vapour deposition (PVD) to produce coating layers; the coating layers being located either above or below the antimicrobial coatings.

Further, when the antimicrobial coatings prepared according to the present invention are applied to glass substrates, the glass substrates may comprise flat glass such as for example float glass or alternatively, the glass substrates may comprises alternative forms of glass such as for example but not limited to: borosilicate glass, rolled plate glass, ceramic glass, toughened glass, chemically strengthened glass, hallow glass or glass shaped for articles such as bottles, jars and medical containers.

According to a first aspect of the present invention there is provided a process for producing an antimicrobial coating on a glass substrate, the process comprising the steps of:
i) providing a glass substrate having a first surface and a second surface;
ii) providing a silicon containing solution and a particle containing solution; and
iii) mixing together the silicon containing solution and the particle containing solution to form a silica coating composition;
iv) contacting at least said first surface of the substrate with the silica coating composition to deposit a layer of silica on the glass substrate; and
iv) curing the silica coating composition deposited on the glass substrate to form a silica matrix coating layer, wherein the particles are deposited on and/or within the silica matrix coating layer in an amount of from 0.1 to 20% by weight.

Preferably, the particle containing solution used to form the silica coating composition with the silicon containing solution comprises metal particles and/or metal agglomerates. Preferably, the metal particles and/or metal agglomerates comprise copper. By agglomerates is meant a cluster of copper particles.

That is, the inventors have found copper particles to be particularly compatible and beneficial in providing effective antimicrobial properties to a glass substrate when mixed and cured with a silicon containing solution to form a silica matrix coating layer.

The copper particles are preferably provided in the particle containing solution in a size range of 10 to 150 nm. More preferably, the copper particles are preferably provided in a size range of 15 to 100 nm. Most preferably however, the copper particles are in a size range of 20 to 60 nm.

When present as agglomerates in the particle containing solution, the copper agglomerates are preferably provided in a size range of 0.1 µm (100 nm) to 10 microns or 0.5 µm to 5 µm. More preferably, the agglomerates in the particle containing solution are preferably provided in a size range of 1 µm to 4 µm.

Alternatively, and/or in addition, the copper may be present in the particle containing solution as discrete particles with a size range of 0.1 µm (100 nm) to 10 microns.

In addition, the copper particles or agglomerates are preferably present in the particle containing solution at a purity level of at least 95.00%. More preferably, the copper particles are preferably present in the particle solution at a purity level of at least 98.00%. Even more preferably the copper particles are preferably present in the particle solution at a purity level of at least 99.00%. Most preferably, the copper particles are preferably present in the particle solution at a purity level of at least 99.50%.

The solution of copper particles may comprise additional metal components such as for example: lead, tin, iron, antimony, nickel, zinc, cadmium, chromium, arsenic and tellurium. However, the additional metal components are preferably each present at levels below 0.005%.

Preferably the silica coating composition applied to the glass substrate according to the present invention comprises at least 0.1% by weight copper. Alternatively, the silica coating composition applied to the glass substrate may comprise 0.5 to 1.5% by weight copper. Alternatively, the silica coating composition applied to the substrate may comprises up to 20% by weight copper.

That is, the silica coating composition deposited on the glass substrate and hence the silica matrix coating layer so formed on the substrate may comprise between 0.1 and 20% by weight of copper. Alternatively, the silica matrix coating layer so formed on the substrate may comprise between 1% by weight and 20% by weight of copper. Alternatively, the silica matrix coating layer so formed on the substrate may comprise between 1% by weight and 15% by weight copper. Alternatively, the silica matrix coating layer so formed on the substrate may comprise between 2% by weight and 10% by weight of copper.

Alternatively, the silica coating composition deposited on the glass substrate and hence the silica matrix coating layer so formed on the substrate may comprise between 1 to 10% by weight of copper. More preferably, the silica matrix coating layer so formed on the substrate may comprise between 2% by weight and 8% by weight of copper. Most preferably, the silica matrix coating layer so formed on the substrate may comprise between 2.5% by weight and 5% by weight.

Preferably, the copper in the silica matrix coating layer is in the form of copper metal, copper (I) oxide, or copper (II) oxide. More preferably, the copper in the silica matrix coating layer is in the form of copper metal or copper (I) oxide. Most preferably however, the copper is in the form of copper metal.

It is also preferred that the amount of copper and the amount of aluminium in the silica matrix coating layer by weight may be the same of different. When the amount of copper and the amount of aluminium in the silica matrix coating layer by weight are different, there may be more copper in the silica matrix coating layer by weight than the amount of aluminium by weight. For instance, there may be present in the silica matrix coating layer between 1 and 20% by weight copper and between 1 and 15% by weight aluminium.

Alternatively, when the amount of copper and the amount of aluminium in the silica matrix coating layer by weight are different, there may be more aluminium in the silica matrix coating layer than the amount of copper. However, it is preferred that there is more copper present in the silica matrix coating layer by weight than the amount of aluminium.

In relation to the first aspect of the present invention, the silicon containing solution and the particle containing solution each preferably comprise a solvent. The solvent used in the silicon containing solution and the particle containing solution may be the same or different. The solvent is preferably selected from the group comprising for example:

ethanol, methanol, isopropyl alcohol, diacetone alcohol, 1-methoxy 2-propoanol (PGME), propylene glycol, methyl isobutyl ketone (MIBK) and mixtures thereof.

Preferably the silica coating composition applied to the glass substrate according to the present invention comprises at least 65% by weight silica. Alternatively, the silica coating composition applied to the glass substrate may comprise at least 75% by weight silica. Alternatively, the silica coating composition applied to the substrate comprises at least 80% by weight silica.

That is, the silica coating composition deposited on the glass substrate and hence the silica matrix coating layer so formed on the substrate may comprise between 65% by weight and 99% by weight of silica. More preferably, the silica matrix coating layer so formed on the substrate may comprise between 65% by weight and 98% by weight of silica. Alternatively, the silica matrix coating layer so formed on the substrate may comprise between 65% by weight and 75% by weight of silica. Alternatively, the silica matrix coating layer so formed on the substrate may comprise between 65% by weight and 90% by weight of silica.

The silica matrix coating layer may be based on for example tetraethyl orthosilicate, $Si(OC_2H_5)_4$ (TEOS) and/or derivatives thereof. Alternatively, the silica matrix coating layer may be based on for example a polysilazane and/or derivatives thereof, such as for example perhydropolysilazane (PHPS), to form a transparent coating which is ideal for use on glass such as float glass.

That is, in the process according to the present invention the silica matrix coating composition may be preferably based on tetraethyl orthosilicate (TEOS). Alternatively, the silica matrix may be based on a polysilazane of formula:

$$[R^1R^2Si—NR^3]_n,$$

wherein:
$R^1$, $R^2$, and $R^3$ are each independently selected from H or $C_1$ to $C_4$ alkyl;
n is an integer such that the polysilazane has a number average molecular weight in the range 150 to 150,000 g/mol.

The polysilazane may preferably comprise perhydropolysilazane (PHPS), wherein each of $R^1$, $R^2$, and $R^3$ are H. Alternatively, the polysilazane may comprise a methyl polysilazane wherein one or more of $R^1$, $R^2$, and $R^3$ is methyl.

Further types of polysilazane may include a compound of formula:
$((R^4R^5Si—NR^6)_o—(R^7R^8Si—NR^9)_p)$ or of $[(R^4R^5Si—NR^6]—[R^7R^8Si—NR^9)]_q$, wherein $R^4$, $R^5$, $R^6$, $R^7$, $R^8$, and $R^9$ are each independently selected from H or $C_1$ to $C_4$ alkyl, and o, p and q are integers. o, p and q may be such that the polysilazane has a number average molecular weight in the range 150 to 150,000 g/mol.

Preferably, the silica matrix coating layer is based on tetraethyl orthosilicate, (TEOS).

In one embodiment of the process according to the present invention the silica coating composition may be applied directly in contact with the glass substrate. Alternatively, the silica coating composition may be applied atop another layer deposited on the glass substrate.

In addition, the silica coating composition may further comprise aluminium. It is preferred that the amount of aluminium in the silica coating composition is set for the required amount of aluminium in the silica matrix coating layer. More preferably, it is preferred that the amount of aluminium in the silica coating composition is set for the required amount of aluminium in the silica matrix coating composition once cured.

For example, the silica coating composition may further comprise at least 1% by weight aluminium. Alternatively, the silica coating composition may comprise less than 1% by weight aluminium. In an alternative embodiment of the invention the silica coating composition may comprise between 1 and 15% by weight aluminium.

Preferably, the silica coating composition may comprise between 2 and 10% by weight aluminium. To improve the durability of the silica matrix coating layer, the silica coating composition preferably comprises between 2 and 8% by weight aluminium.

The aluminium is preferably present in the silica coating composition in the form of an oxide of aluminium. The aluminium is preferably provided in the silicon containing solution in the form of aluminium chloride hexahydrate, $AlCl_3.6H_2O$, which forms aluminium oxide during curing.

In relation to the process according to the present invention the silica coating composition may preferably be applied to the glass substrate by one or more of: dip coating; spin coating; curtain coating; roller coating; spray coating; air atomisation spraying; ultrasonic spraying; or slot-die coating. Most preferably however, the silica coating is applied by spray coating or roller coating.

When following the process according to the present invention the surface of the glass substrate may be cleaned before applying the silica coating composition to improve coating quality. Cleaning the glass substrate may preferably comprise one or more of: abrasion with ceria, washing with alkaline aqueous solution, rinsing with deionised water rinse and/or plasma treatment. Cleaning preferably removes any unwanted dust or dirt particles which may have collected prior to application of the silica layer.

Curing of the silica coating composition may preferably be performed by irradiating the glass substrate once the silica coating composition has been applied with ultraviolet radiation, and/or by heating to a temperature in the range 90° C. to 450° C. More preferably, the process according to the present invention may preferably comprise curing the silica coating composition by heating to a temperature in the range 90° C. to 250° C. Curing of the silica coating composition is advantageous as it may improve the density of the silica matrix coating layer and the speed at which the silica matrix coating layer forms.

Preferably, the silica matrix coating layer is deposited to a thickness in the range 5 nm to 250 nm. Alternatively, the silica matrix coating layer is deposited to a thickness in the range 5 nm to 200 nm. More preferably, the silica matrix coating layer is deposited to a thickness in the range 10 to 100 nm, or the silica matrix coating layer may be deposited to a thickness in the range 20 to 80 nm. Most preferably however, the silica matrix coating layer is deposited to a thickness in the range 25 to 60 nm, or even, 30 to 50 nm.

The silica matrix coating layer comprising copper, and with or without aluminium may be used also in combination with coatings applied to glass substrates by for example chemical vapour deposition and/or physical vapour deposition, and which are applied either above or below the silica matrix coating layer.

In relation to the process according to the present invention, in an alternative embodiment a transparent conductive oxide coating may preferably be applied to the glass substrate before deposition of the silica coating composition.

According to a second aspect of the present invention there is preferably provided an antimicrobial coated substrate preparing in accordance with the first aspect of the present invention comprising:

i) a glass substrate; and
ii) a silica matrix coating layer wherein the silica matrix coating layer comprises:
   a) at least 65% by weight silica; and
   b) copper particles retained above and/or within the silica matrix; and
wherein growth of bacteria on the substrate is reduced by at least 10% compared with non-coated glass substrates.

Alternatively, in terms of microbe reduction, in relation to the second aspect of the present invention there is provided preferably, an antimicrobial coated substrate wherein the coated substrate provides at least a 2-log reduction against gram positive and/or gram-negative bacteria within 2 hours at 37° C.

A 2-log reduction or 2-log kill, reduces a microbe colony to 10,000 bacteria after a 99.0% reduction and a 3-log kill reduces a microbe colony to 1,000 bacteria after a 99.9% reduction.

Preferably, the antimicrobial coated substrate may further comprise at least 1.0% by weight aluminium. The aluminium is preferably present as an oxide of aluminium.

According to a third aspect of the present invention there is preferably provided architectural glazing comprising an antimicrobial coated substrate prepared according to the first aspect of the present invention.

According to a fourth aspect of the present invention there is preferably provided the use of an antimicrobial coated substrate prepared by the process according to the first aspect of the present invention, and/or an antimicrobial coated substrate according to a second aspect of the present invention in the preparation of an insulated glazing unit, an automotive glazing unit, an electronic device, mirror or glass bottle.

It will therefore be appreciated that all aspects of the present invention in relation to the first aspect of the present invention also apply in relation to the second, third and fourth aspects of the present invention as appropriate.

BRIEF DESCRIPTION OF THE DRAWINGS

Embodiments of the present invention will now be described by way of example only with reference to the following examples and drawings in which.

DETAILED DESCRIPTION OF THE INVENTION

Materials

Figure 1:
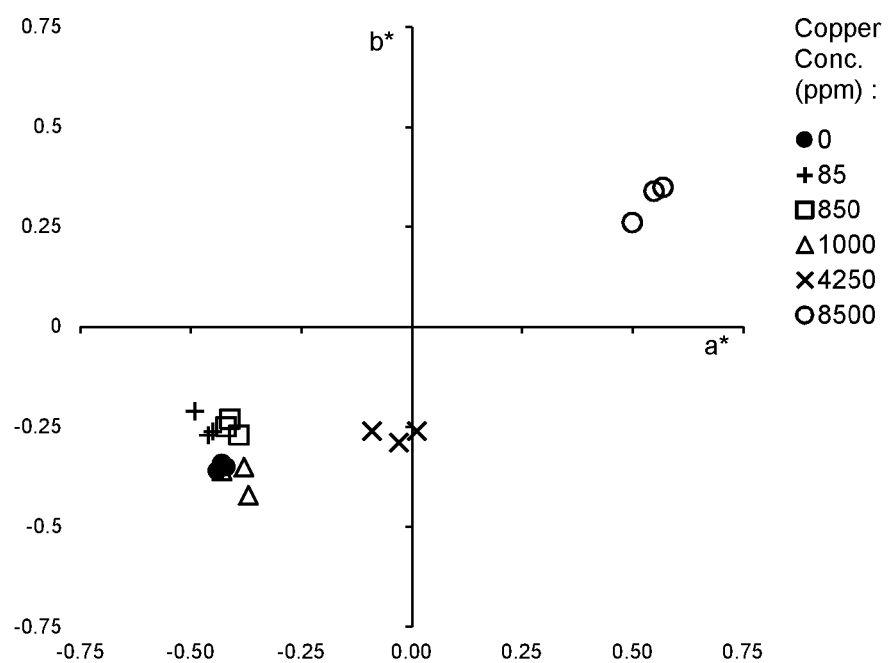
FIG. 1—illustrates the reflected colour space (D65/2) values for samples 36 to 41 for a range of copper concentrations.

Copper particles were obtained from Nanotec.
TEOS is tetraethyl orthosilicate, (also named tetraethoxysilane and abbreviated to TEOS), it has the formula $Si(OC_2H_5)_4$ and is the ethyl ester of orthosilicic acid, $Si(OH)_4$. It is available from Merck.

Aluminium is provided for use in the present invention as aluminium chloride hexahydrate ($AlCl_3.6H_2O$). The amount of aluminium chloride hexahydrate ($AlCl_3.6H_2O$) used is preferably based on the amount of aluminium required in the silica matrix coating layer. For example, the amount of aluminium chloride hexahydrate ($AlCl_3.6H_2O$) used may be sufficient to provide 7% by weight aluminium oxide in the silica matrix coating layer (following curing) compared to the total mass of silica.

Experimental

1. Deposition of Silica and Copper Particles by Spin Coating Followed by Heat Treatment Samples 1 to 24 were prepared to evaluate the antimicrobial effectiveness of a range of copper particle concentrations with a silica matrix derived from tetraethyl orthosilicate (TEOS) when applied by spin coating to glass substrates. For all 24 spin coating samples, the apparatus used was a Spin G3-B available from SCS (Specialty Coating System™).

To prepare the samples, a 10% by weight silica solution was first prepared by hydrolysing TEOS (tetraethyl orthosilicate) in isopropyl alcohol (IPA) and de-ionised water (DI), with 1M hydrochloric acid as the catalyst for the sol gel reaction. The solution was stirred for 4 hours at room temperature. The solution was then diluted with a copper particle dispersion in either ethanol or isopropyl alcohol, to achieve copper concentrations ranging from 30 ppm to 100 ppm as indicated in Table 1a.

TABLE 1

|  | Weight % of material in stock hydrolysed TEOS solution. |
|---|---|
| TEOS (tetraethyl orthosilicate) | 34.66 |
| Isopropyl alcohol (IPA) | 53.32 |
| De-ionised water (DI) | 11.02 |
| 1M HCl | 1.00 |

TABLE 1a

| Sample | Solvent | Copper particle concentration (ppm) |
|---|---|---|
| 1 | ethanol | 30 |
| 2 | ethanol | 50 |
| 3 | ethanol | 100 |
| 4 | isopropanol | 30 |

TABLE 1a-continued

| Sample | Solvent | Copper particle concentration (ppm) |
|---|---|---|
| 5 | isopropanol | 50 |
| 6 | isopropanol | 100 |

Copper particle dispersions of different concentrations in ethanol and isopropyl alcohol (as shown in Table 1a) were then combined with the hydrolysed TEOS solution in the ratios indicated for experiments 1 to 24 in Table 1 b. The mixtures were stirred for up to 5 minutes before application to a glass substrate. If required, the samples were sonicated to ensure dispersion of the copper particles.

Each copper particle and TEOS solution mixture was then applied individually to a 10 cm by 10 cm glass substrate using a spin coater set to the following parameters:
 i) acceleration time 0.4 seconds,
 ii) spin time 20 seconds,
 iii) spin speed 2000 rpm,
 iv) deceleration time 0.4 seconds.

Following application of each TEOS/copper particle solution mixture to the 10 cm by 10 cm glass substrate, the resultant glass substrate with silica coating was heat treated at a temperature of 200° C. for around 1 hour. The thickness of the silica layer deposited was between 30 nm and 40 nm.

Each glass substrate comprised soda-lime silicate glass such as float glass available from NSG. A typical soda-lime silicate glass composition comprises by weight for example: $SiO_2$ 69-74%; $Al_2O_3$; $Na_2O$ 10-16%; $K_2O$ 0-5%; MgO 0-6%; CaO 5-14%; $SO_3$ 0-2%; and $Fe_2O_3$ 0.005-2%.

In relation to the present invention, the soda-lime silicate glass composition may also contain colouring agents such as $CO_3O_4$, NiO and Se to impart to the glass composition a desired colour when viewed in transmitted light. The transmitted light may be measured in terms of a recognised standard such as BS EN 410. The glass composition may also contain other additives, for example refining aids, present in an amount up to 2%. In addition, the soda-lime silicate glass may be coated or uncoated.

TABLE 1b

| Glass Substrate Sample coated with coating A or coating B | Volume of 10% TEOS in IPA solution (ml) in mixture | Volume of copper particle solution (ml) in mixture | Final concentration of silica by weight and copper particles spin coated onto coated or uncoated glass substrate |
|---|---|---|---|
| 1 | A | 5 | 5 ml of 30 ppm Cu in ethanol | 5% silica, 15 ppm copper on A |
| 2 | A | 5 | 5 ml of 50 ppm Cu in ethanol | 5% silica, 25 ppm copper on A |
| 3 | A | 5 | 5 ml of 100 ppm Cu in ethanol | 5% silica, 50 ppm copper on A |
| 4 | A | 5 | 5 ml of 30 ppm Cu in ethanol | 5% silica, 15 ppm copper on A |
| 5 | A | 5 | 5 ml of 50 ppm Cu in ethanol | 5% silica, 25 ppm copper on A |
| 6 | A | 5 | 5 ml of 100 ppm Cu in ethanol | 5% silica, 50 ppm copper on A |
| 7 | B | 5 | 5 ml of 30 ppm Cu in IPA | 5% silica, 15 ppm copper on B |
| 8 | B | 5 | 5 ml of 50 ppm Cu in IPA | 5% silica, 25 ppm copper on B |
| 9 | B | 5 | 5 ml of 100 ppm Cu in ethanol | 5% silica, 50 ppm copper on B |
| 10 | B | 5 | 5 ml of 30 ppm Cu in IPA | 5% silica, 15 ppm copper on B |
| 11 | B | 5 | 5 ml of 50 ppm Cu in IPA | 5% silica, 25 ppm copper on B |
| 12 | B | 5 | 5 ml of 100 ppm Cu in ethanol | 5% silica, 50 ppm copper on B |
| 13 | A | 5 | 5 ml of 30 ppm Cu in IPA | 5% silica, 15 ppm copper on A |
| 14 | A | 5 | 5 ml of 50 ppm Cu in IPA | 5% silica, 25 ppm copper on A |
| 15 | A | 5 | 5 ml of 100 ppm Cu in IPA | 5% silica, 50 ppm copper on A |
| 16 | A | 5 | 5 ml of 30 ppm Cu in IPA | 5% silica, 15 ppm copper on A |
| 17 | A | 5 | 5 ml of 50 ppm Cu in IPA | 5% silica, 25 ppm copper on A |
| 18 | A | 5 | 5 ml of 100 ppm Cu in IPA | 5% silica, 50 ppm copper on A |
| 19 | B | 1 | 9 ml of 30 ppm Cu in IPA | 1% silica, 27 ppm copper on B |
| 20 | B | 1 | 9 ml of 50 ppm Cu in IPA | 1% silica, 45 ppm copper on B |
| 21 | B | 1 | 5 ml of 100 ppm Cu in IPA | 1% silica, 90 ppm copper on B |
| 22 | B | 1 | 9 ml of 30 ppm Cu in IPA | 1% silica, 27 ppm copper on B |
| 23 | B | 1 | 9 ml of 50 ppm Cu in IPA | 1% silica, 45 ppm copper on B |
| 24 | B | 1 | 5 ml of 100 ppm Cu in IPA | 1% silica, 90 ppm copper on B |

Glass 'A' comprises an antireflection coated glass sheet available under the tradename Optiview™ from NSG.
Glass 'B' comprises a non-coated glass sheet of float glass available under the tradename Optifloat™ from NSG.

2. Deposition of Silica, Aluminium and Copper Particles by Spray Coating Followed by Heat Treatment A series of samples, numbered 25 to 32 were prepared to evaluate the effective antimicrobial reduction of a range of copper particle concentrations in a silica matrix coating layer comprising tetraethyl orthosilicate (TEOS) in combination with aluminium, when applied by spray coating to a 30 cm by 30 cm glass substrate. In each of sample experiments 25 to 32, the spray coated apparatus used was a Sonotek spray coater.

For samples 25 to 28, a solution for deposition by spray coating was achieved by:
 i) preparing a 100 ppm solution of copper particles using isopropyl alcohol (IPA);
 ii) preparing a solution of TEOS (tetraethyl orthosilicate) in isopropyl alcohol (IPA), deionised water (DI) and 1M hydrochloric acid (HCl) (as in Table 1), for four hours at room temperature and combining with aluminium chloride hexahydrate to achieve a solution comprising 9.3% $SiO_2$ and 0.7% $Al_2O_3$; and
 iii) mixing 10 ml of the solution containing 9.3% $SiO_2$ and 0.7% $Al_2O_3$ with 50 ml of the 100 ppm copper particle in isopropyl alcohol (IPA) solution.

For samples 29 to 32, a solution for deposition by spray coating was achieved by:
 i) preparing a 100 ppm solution of copper particles using ethanol;

ii) preparing a solution of TEOS (tetraethyl orthosilicate) in isopropyl alcohol (IPA) and combining with aluminium chloride hexahydrate to achieve a solution comprising 9.3% $SiO_2$ and 0.7% $Al_2O_3$; and iii) mixing 25 ml of the solution containing 9.3% $SiO_2$ and 0.7% $Al_2O_3$ with 25 ml of the 100 ppm copper particle in ethanol solution to achieve a spray coating mixture of silica-aluminium with 50 ppm copper particles.

Each silica coating composition sample (2 ml) was then applied individually to a 30 cm by 30 cm square float glass substrates by spray coating at room temperature and pressure. Each glass substrate comprised soda-lime silicate glass such as float glass available from NSG with a typical composition as indicated above.

Details of the raster speed and flow rate for each of the 8 samples applied by spray coating are provided in Table 2.

TABLE 2

| Sample | Raster speed (mm/s) | Flow rate (ml/min) | Final copper concentration in coating solution (ppm) | Additive Solvent |
|---|---|---|---|---|
| 25 | 150 | 1.5 | 90 | Isopropylalcohol (IPA) |
| 26 | 150 | 3 | 90 | Isopropylalcohol (IPA) |
| 27 | 75 | 3 | 90 | Isopropylalcohol (IPA) |
| 28 | 75 | 1.5 | 90 | Isopropylalcohol (IPA) |
| 29 | 150 | 1.5 | 50 | ethanol |
| 30 | 150 | 3 | 50 | ethanol |
| 31 | 75 | 3 | 50 | ethanol |
| 32 | 75 | 1.5 | 50 | ethanol |

Following application of each silica coating composition comprising a solution of TEOS-aluminium and copper particles to a 30 cm by 30 cm (uncoated) float glass substrate, the applied silica-aluminium coating composition was heat treated at a temperature of 200° C. for around 1 hour.

Durability Testing of Spray Coated Samples

3. Humidity Testing

Float glass substrate samples provided with a silica matrix coating layer derived from: tetraethyl orthosilicate (TEOS) with 50 ppm copper particles in ethanol (sample 32), and a silica matrix coating layer derived from: tetraethyl orthosilicate (TEOS) with 90 ppm copper particles in isopropyl alcohol (sample 28), were tested for relative durability (or deterioration) by being subjected to high temperature and high humidity conditions. The samples were placed in a Thermotron SM-8-7800 temperature and humidity cabinet and inspected after a set time in the cabinet. The conditions for the humidity testing are provided in Table 3.

TABLE 3

Conditions for Humidity Testing

| | Temperature ° C. | Humidity % | Time |
|---|---|---|---|
| Starting conditions | 30 | 30 | 0 |
| Ramp 1 | 30 to 70 | 30 | 30 minutes |
| Ramp 2 | 70 | 30 to 75 | 30 minutes |
| Hold | 70 | 75 | 30 hours |

Following humidity testing, the surface of each silica coated glass substrate was inspected. It was found that there was visually no change to the surface of the silica coated float glass substrate, indicating that the silica matrix coating layer prepared by the method of the present invention is able to withstand the humidity testing required of coated glass.

4. Scratch Testing

An Erichsen model 314 universal scratch tester was used to investigate the resilience of the silica matrix coating layers prepared according to the present invention to scratching. The test uses a metal stylus and a turntable to which is applied a sample to be tested. The turntable is rotated, and a downward force applied and increased until scratches are visible on the coated substrate. Table 4 provides details of the samples tested and the scratch test results.

TABLE 4

Results of scratch testing

| Sample | Load at which first 'broken' scratch appears (N) | Load at which first 'continuous' scratch appears (N) | Result |
|---|---|---|---|
| Glass substrate coated with silica derived from TEOS and 50 ppm copper in ethanol, sample 32 | 1 | 5 | — |
| Glass substrate coated with silica derived from TEOS and 90 ppm copper in isopropyl alcohol, sample 28 | 8 | — | No single full scratch developed during testing |
| Glass substrate coated with silica derived from TEOS and IPA, reference sample. | — | — | No visible scratching during testing |
| Glass substrate coated with silica derived from TEOS and Ethanol, reference sample. | 7 | 9 | — |

5. Deposition of Silica and Copper Particles by Roller Coating Followed by Heat Treatment Samples 33 to 35 were prepared to evaluate the antimicrobial effectiveness of a range of copper particle concentrations in a silica matrix coating layer derived from tetraethyl orthosilicate (TEOS) in combination with aluminium, applied by roller coating to a glass substrate. In each of experiments 33 to 35, the roller coated apparatus used was a Burckle easy-Coater RCL-M 700 Roller Coater. Each coating was applied individually to a glass substrate with dimensions 30 cm by 40 cm.

TABLE 5

| Sample | Substrate | Coating composition based on | Curing | Result |
|---|---|---|---|---|
| Sample 33 | Float glass | i) copper particles in isopropyl alcohol<br>ii) TEOS in diacetone alcohol/propylene glycol and $Al_2O_3$ mixture. | 2 hours at 250° C. | Good |
| Sample 34 | Glass substrate coated with antireflective coating- (Pilkington OptiView ™) | i) copper particles in isopropyl alcohol<br>ii) TEOS in diacetone alcohol/propylene glycol and $Al_2O_3$ mixture. | 2 hours at 250° C. | A large number of spots were observed with some colouration |
| Sample 35 | Glass substrate coated with a transparent conductive oxide (TCO)-NSG TEC ™ | i) Copper particles in isopropyl alcohol<br>ii) TEOS in diacetone alcohol/propylene glycol and $Al_2O_3$ mixture. | 2 hours at 250° C. | Good, some finger marks observable and edge marks. |

For each of samples 33 to 35, a solution for deposition by roller coating was prepared by:

i) preparing a 100 ppm solution of copper particles using isopropyl alcohol (IPA);

ii) preparing a solution of TEOS (tetraethyl orthosilicate) in diacetone alcohol, propylene glycol, deionised water and 1 M HCl, and combining with aluminium chloride hexahydrate to achieve a solution containing 9.3% $SiO_2$ and 0.7% $Al_2O_3$; and iii) mixing 500 ml of the solution containing 9.3% $SiO_2$ and 0.7% $Al_2O_3$ with 500 ml of the 100 ppm copper particles in isopropyl alcohol (IPA) solution.

Each silica coating composition sample (32 to 35), was tested by pumping the sample into a channel on the roller coater between the doctor roller, application roller and sealing end plates. The solution coated the application roller, which in turn applied the solution to the glass substrate. As indicated in Table 5, the glass substrate for sample 33 comprised soda-lime silicate glass such as float glass available from NSG. A typical soda-lime silicate glass composition comprises by weight for example: $SiO_2$ 69-74%; $Al_2O_3$; $Na_2O$ 10-16%; $K_2O$ 0-5%; MgO 0-6%; CaO 5-14%; $SO_3$ 0-2%; and $Fe_2O_3$ 0.005-2%. For sample 34, the glass substrate comprised an antireflective coating, available from NSG under the tradename Pilkington OptiView™. For sample 35, the glass substrate comprised a glass sheet coated with a transparent conductive oxide, available from NSG under the tradename NSG TEC™.

Prior to roller coating, the glass substrates were cleaned in a flat-bed washing machine. Following coating, the samples were thermally cured at 200° C. for an hour in a convectively heated oven to produce a silica matrix coating layer. Roller coating conditions are provided in Table 5b. The doctor roller may be textured to improve the transfer of the material to be coated to the application roller.

6. Antimicrobial Testing

A series of antimicrobial testing protocols were conducted for:

i) the spin coated samples;
ii) the spray coated samples;
iii) the spray coated samples following durability testing;
iv) the spray coated samples after toughening; and
v) the roller coated samples.

All antimicrobial testing was conducted by the Pontificia Universidad Catolica de Valaparaiso, Chile using a standard protocol based on ISO 22916, details of which are incorporated herein by reference.

6i). Antimicrobial Testing of Spin Coated Samples (1 to 24)

The silica matrix coating layer samples deposited by spin coating were subject to antibacterial testing against *Escherichia coli* (*E. coli*) and *Staphyloccus aureus* MRSA according to ISO 22196 as follows.

The bacteria were incubated in contact with the silica matrix coating layer samples for 6, 8 and 24 hours at 37° C. In accordance with ISO2216, the antibacterial activity (or log reduction), R, was calculated according to Formula 1.

In addition, the percentage of bacteria killed with respect to both the untreated test specimens immediately after inoculation (% I) and the untreated test specimens after incubation time t, (% R) were calculated according to Formulae 2 and 3:

$$R = \log_{10}(U_t) - \log_{10}(A_t) \quad \text{Formula 1}$$

TABLE 5b

| Sample | Substrate | Pinch (mm) (between application and doctor rollers) | Compression (mm) (between application roller and glass substrate) | Roller Speeds (m/min) (Application, doctor and transport) |
|---|---|---|---|---|
| 33 | Pilkington Optifloat ™ | 0.3 | 0.3 | 3 |
| 34 | AR coated glass | 0.3 | 0.3 | 3 |
| 35 | TCO coated glass | 0.3 | 0.3 | 3 |

-continued $$\%\,R = \left(\frac{U_t - A_t}{U_t}\right) \times 100 \qquad \text{Formula 2}$$

$$\%\,I = \left(\frac{U_0 - A_t}{U_0}\right) \times 100 \qquad \text{Formula 3}$$

where $U_0$ is the average number of viable bacteria, in cells/cm², recovered from the untreated test specimens immediately after inoculation;

$U_t$ is the average number of viable bacteria, in cells/cm², recovered from the untreated test specimens after incubation time, t;

$A_t$ is the average number of viable bacteria, in cells/cm², recovered from the treated test specimens after incubation time, t.

The results of the antimicrobial activity for *Escherichia coli* DH5α in contact with the silica matrix coating layers samples after 6 hours, 8 hours and 24 hours are provided in Tables 6a to 6c respectively, and for *Staphylococcus aureus* MRSA in Tables 6d to 6f respectively.

TABLE 6a

*Escherichia coli* DH5α incubation time-6 hours

| Sample | R | % R | % I |
| --- | --- | --- | --- |
| Uncoated Reference-glass B | — | — | 19.35 |
| 45 ppm IPA-glass B | 0.01 | 1.40 | 20.48 |
| 90 ppm IPA-glass B | 0.09 | 19.55 | 35.12 |
| Uncoated Reference-glass A | — | — | 3.23 |
| 15 ppm ETOH-glass A | 0.08 | 16.67 | 19.35 |
| 50 ppm ETOH-glass A | 0.00 | 0.00 | 3.23 |
| 15 ppm IPA-glass A | 0.11 | 23.17 | 31.45 |
| 50 ppm IPA-glass A | 0.17 | 32.50 | 34.68 |

TABLE 6b

*Escherichia coli* DH5α incubation time-8 hours

| Sample | R | % R | % I |
| --- | --- | --- | --- |
| Uncoated Reference-glass B | — | — | 20.61 |
| 45 ppm IPA on glass B | 0.30 | 49.49 | 59.68 |
| 90 ppm IPA on glass B | 0.62 | 75.76 | 80.65 |
| Uncoated Reference-glass A | — | — | 19.35 |
| 15 ppm ETOH on glass A | 0.12 | 25.00 | 39.52 |
| 50 ppm ETOH on glass A | 0.26 | 45.00 | 55.65 |
| 15 ppm IPA on glass A | 0.14 | 28.00 | 41.94 |
| 50 ppm IPA on glass A | 0.19 | 35.00 | 47.58 |

TABLE 6c

*Escherichia coli* DH5α incubation time-24 hours

| Sample | R | % R | % I |
| --- | --- | --- | --- |
| Uncoated Reference-glass B | — | — | 93.02 |
| 45 ppm IPA on glass B | 0.27 | 45.73 | 96.21 |
| 90 ppm IPA on glass B | 1.82 | 98.50 | 99.90 |
| Uncoated Reference-glass A | — | — | 47.58 |
| 15 ppm ETOH on glass A | 0.50 | 68.31 | 89.39 |
| 50 ppm ETOH on glass A | 1.21 | 93.85 | 96.77 |
| 15 ppm IPA on glass A | 0.01 | 2.62 | 48.95 |
| 50 ppm IPA on glass A | 0.68 | 78.92 | 88.95 |

TABLE 6d

Result of CFU/ml, % I and % R of *Staphylococcus aureus* MRSA incubation time-6 hours

| Sample | R | % R | % I |
| --- | --- | --- | --- |
| Uncoated Reference-glass B | — | — | 0.90 |
| 45 ppm IPA on glass B | 0.04 | 9.09 | 9.91 |
| 90 ppm IPA on glass B | 0.23 | 40.91 | 41.44 |
| Uncoated Reference-glass A | — | — | 9.91 |
| 15 ppm ETOH on glass A | 0.06 | 12.00 | 20.72 |
| 50 ppm ETOH on glass A | 0.12 | 25.00 | 32.43 |
| 15 ppm IPA on glass A | 0.05 | 10.00 | 18.92 |
| 50 ppm IPA on glass A | 0.02 | 4.00 | 13.51 |

TABLE 6e

Result of CFU/ml, % I and % R of *Staphylococcus aureus* MRSA incubation time-8 hours

| Sample | R | % R | % I |
| --- | --- | --- | --- |
| Uncoated Reference-glass B | — | — | 22.52 |
| 45 ppm IPA on glass B | 0.28 | 47.67 | 59.46 |
| 90 ppm IPA on glass B | 0.86 | 86.05 | 89.19 |
| Uncoated Reference-glass A | — | — | 9.91 |
| 15 ppm ETOH on glass A | 0.38 | 58.00 | 62.16 |
| 50 ppm ETOH on glass A | 0.34 | 54.00 | 58.56 |
| 15 ppm IPA on glass A | 0.18 | 34.00 | 40.54 |
| 50 ppm IPA on glass A | 0.25 | 44.20 | 49.73 |

TABLE 6f

Result of CFU/ml, % I and % R of *Staphylococcus aureus* MRSA incubation time-24 hours

| Sample | R | % R | % I |
| --- | --- | --- | --- |
| Uncoated Reference-glass B | — | — | 73.24 |
| 45 ppm IPA on glass B | 0.12 | 24.92 | 79.90 |
| 90 ppm IPA on glass B | 1.15 | 92.93 | 98.11 |
| Uncoated Reference-glass A | — | — | 12.88 |
| 15 ppm ETOH on glass A | 0.68 | 79.01 | 81.71 |
| 50 ppm ETOH on glass A | 0.57 | 73.11 | 76.58 |
| 15 ppm IPA on glass A | 0.53 | 70.32 | 74.14 |
| 50 ppm IPA on glass A | 1.47 | 96.62 | 97.05 |

The results demonstrate that samples with copper present reduce the bacterial load compared to controls without copper present. The antibacterial activity increased after 24 hours. In addition, the antibacterial activity was comparable across all substrate types. An increase in the antimicrobial activity was observed with increased copper concentrations. The highest colony reduction was found for the samples with 90 ppm of copper in isopropyl alcohol (IPA) (98.5% reduction *E. coli*) and the sample with 50 ppm of copper in IPA (96.62% reduction MRSA).

6ii). Antibacterial Testing of Spray Coated Samples (25 to 32)

The spray coated silica glass substrates from samples 25 to 32 were tested for antibacterial testing against *Escherichia coli* (*E. coli*) and *Staphyloccus aureus* MRSA as follows.

The bacteria were incubated in contact with the samples for 6, 8 and 24 hours at 37° C. In accordance with ISO2216, the antibacterial activity (or log reduction), R, was calculated according to Formula 1. In addition, the percentage of bacteria killed with respect to both the untreated test specimens immediately after inoculation (% I) and the untreated test specimens after incubation time, t, (% R) were calculated according to Formulae 2 and 3.

The results provided in Tables 7a to 7f, indicate that samples show a reduction of bacterial load with respect to control. The highest values were observed with samples 28 and 32. In the case of sample 32, a % R of 96.88% for *E. coli* was observed and a % R 96.53% for *S. aureus* after 24 hours of incubation. In the case of sample 28, the higher values of % R were observed at 24 hours with 98.44% and 96.13% for *E. coli* and *S. aureus* respectively.

TABLE 7a

Result of CFU/ml, % I and % R of *Escherichia coli* DH5α incubation time 6 hours.

| Sample | R | % R | % I |
|---|---|---|---|
| Reference | — | — | 20.54 |
| 25 | 0.14 | 28.29 | 43.02 |
| 26 | 0.19 | 35.12 | 48.45 |
| 27 | 0.23 | 41.46 | 53.49 |
| 28 | 0.23 | 41.46 | 53.49 |
| 29 | 0.05 | 11.71 | 29.84 |
| 30 | 0.14 | 28.29 | 43.02 |
| 31 | 0.16 | 30.24 | 44.57 |
| 32 | 0.23 | 40.98 | 53.1 |

TABLE 7b

Result of CFU/ml, % I and % R of *Escherichia coli* DH5α incubation time 8 hours.

| Sample | R | % R | % I |
|---|---|---|---|
| Reference | — | — | 44.57 |
| 25 | 0.36 | 56.64 | 75.97 |
| 26 | 0.41 | 61.54 | 78.68 |
| 27 | 0.48 | 67.13 | 81.78 |
| 28 | 0.58 | 73.43 | 85.27 |
| 29 | 0.16 | 30.77 | 61.63 |
| 30 | 0.25 | 44.06 | 68.99 |
| 31 | 0.36 | 55.94 | 75.58 |
| 32 | 0.41 | 61.54 | 78.68 |

TABLE 7c

Result of CFU/ml, % I and % R of *Escherichia coli* DH5α incubation time 24 hours.

| Sample | R | % R | % I |
|---|---|---|---|
| Reference | — | — | 92.56 |
| 25 | 1.32 | 95.26 | 99.65 |
| 26 | 1.43 | 96.25 | 99.72 |
| 27 | 1.62 | 97.6 | 99.82 |
| 28 | 1.81 | 98.44 | 99.88 |
| 29 | 1.23 | 94.06 | 99.56 |
| 30 | 1.32 | 95.21 | 99.64 |
| 31 | 1.32 | 95.16 | 99.64 |
| 32 | 1.51 | 96.88 | 99.77 |

TABLE 7d

Result of CFU/ml, % I and % R of *Staphylococcus aureus* MRSA incubation time 6 hours.

| Sample | R | % R | % I |
|---|---|---|---|
| Reference | — | — | 19.13 |
| 25 | 0.13 | 25.68 | 39.89 |
| 26 | 0.19 | 35.81 | 48.09 |
| 27 | 0.26 | 45.27 | 55.74 |
| 28 | 0.28 | 47.3 | 57.38 |
| 29 | 0.10 | 20.95 | 36.07 |
| 30 | 0.17 | 31.76 | 44.81 |
| 31 | 0.21 | 38.51 | 50.27 |
| 32 | 0.26 | 45.27 | 55.74 |

TABLE 7e

Result of CFU/ml, % I and % R of *Staphylococcus aureus* MRSA incubation time 8 hours.

| Sample | R | % R | % I |
|---|---|---|---|
| Reference | — | — | 49.18 |
| 25 | 0.16 | 30.11 | 64.48 |
| 26 | 0.24 | 41.94 | 70.49 |
| 27 | 0.30 | 49.46 | 74.32 |
| 28 | 0.39 | 59.14 | 79.23 |
| 29 | 0.09 | 18.28 | 58.47 |
| 30 | 0.16 | 30.11 | 64.48 |
| 31 | 0.24 | 41.94 | 70.49 |
| 32 | 0.44 | 63.44 | 81.42 |

TABLE 7f

Result of CFU/ml, % I and % R of *Staphylococcus aureus* MRSA incubation time 24 hours.

| Sample | R | % R | % I |
|---|---|---|---|
| Reference | — | — | 90.55 |
| 25 | 1.11 | 92.20 | 99.26 |
| 26 | 1.12 | 92.49 | 99.29 |
| 27 | 1.25 | 94.39 | 99.47 |
| 28 | 1.41 | 96.13 | 99.63 |
| 29 | 1.10 | 92.08 | 99.25 |
| 30 | 1.14 | 92.72 | 99.31 |
| 31 | 1.30 | 94.97 | 99.52 |
| 32 | 1.46 | 96.53 | 99.67 |

In summary, for the spray coated samples, it was shown that raster speed may influence the antimicrobial performance more than the liquid flow rate. The samples created with a slower raster speed of 75 mm/s, as opposed to 150 mm/s, consistently showed greater antimicrobial activity for both MRSA and *E. coli*, for each time period measured. Decreasing the flow rate from 3 ml per minute to 1.5 ml per minute did not consistently demonstrate a decrease in antimicrobial activity.

Table 8—provides summary details of the antimicrobial reduction activity (% R) of *Escherichia coli* DH5α and *Staphylococcus aureus* MRSA after 24 hours for spray coated samples compared with the raster speed and flow rate of the deposition with differing copper concentrations and solvents in the presence of aluminium oxide ($Al_2O_3$).

TABLE 8

| Sample | Raster speed (mm/s) | Flow rate (ml/min) | Final concentration of copper (ppm) | Solvent | E. Coli % R After 24 hours | MRSA % R After 24 hours |
|---|---|---|---|---|---|---|
| 25 | 150 | 1.5 | 90 | IPA | 95.26 | 92.20 |
| 26 | 150 | 3.0 | 90 | IPA | 96.25 | 92.49 |

TABLE 8-continued

| Sample | Raster speed (mm/s) | Flow rate (ml/min) | Final concentration of copper (ppm) | Solvent | E. Coli % R After 24 hours | MRSA % R After 24 hours |
| --- | --- | --- | --- | --- | --- | --- |
| 27 | 75 | 3.0 | 90 | IPA | 97.60 | 94.39 |
| 28 | 75 | 1.5 | 90 | IPA | 98.44 | 96.13 |
| 29 | 150 | 1.5 | 50 | EtOH | 94.06 | 92.08 |
| 30 | 150 | 3.0 | 50 | EtOH | 95.21 | 92.72 |
| 31 | 75 | 3.0 | 50 | EtOH | 95.16 | 94.97 |
| 32 | 75 | 1.5 | 50 | EtOH | 96.88 | 96.53 |

It can be from Table 8 that for the spray coated samples of *Escherichia coli* DH5α, the best performing sample was sample 28, in ethanol, with a raster speed of 75 mm per second, a flow rate of 1.5 ml per minute and 90 ppm copper, providing a 24 hour antimicrobial reduction activity (% R) of 98.44%. For *Staphylococcus aureus* MRSA, the best performing sample was sample 32, in IPA, also with a 75 mm per second raster speed, a flow rate of 1.5 ml per minute and 50 ppm copper, which provided a 24 hour antimicrobial reduction activity (% R) of 96.53%. In terms of antimicrobial performance, the samples comprising 90 ppm copper in IPA and 50 ppm in ethanol both performed effectively.

7. Leach Testing—with Phosphate-Buffered Saline (PBS)

Samples 28 and 32 were subjected to leach testing with phosphate-buffered saline (PBS) to simulate human body contact. The leach test involved placing a 5×5 cm sample, coated side upwards, in a 200 ml sealable container. 50 ml of PBS solution (available from Lonza as AccuGENE®) was added to the container. The container and contents were then left at room temperature for a leach time of 8 hours, 7 days, 14 days and 28 days. After the specified leach time, each sample was washed with de-ionised water and then removed from the container. The PBS solution was then washed into a 100 ml flask, 5 ml HCl added, and then made to volume with deionised water. The sample was returned to the container and a further 50 ml PBS added to the mixture.

The sample solution was analysed for copper using the ICP-OES. The standards were matrix matched with 50 ml PBS and 5 ml HCl. It was found that no significant leaching of copper occurred from the coated samples.

8. Surface Topography Analysis of Spray Coated Sample Following Toughening

Spray coating samples 28 (90 ppm copper particles) and 32 (50 ppm copper particles) were toughened (thermally tempered), by heating in a muffle furnace at 650° C. for five minutes. The topography of the coating layers was then analysed, and the results compared with samples which had not been toughened. The silica/aluminium matrix coating layer produced with copper particles using ethanol as solvent was thicker than the sample prepared using isopropanol as solvent. The results were obtained using a FEI Nova NanoSEM 450 and EDAX Octane plus EDS detector with TEAM software. Optical micrographs of each sample were obtained using a WILD stereomicroscope. Images were obtained using dark field illumination, and a mixed field variant (partial eclipsing of the transmitted light source).

Samples were prepared for imaging in the scanning electron microscope by framing each sample using copper tape and mounting each sample to aluminium scanning electron microscopy (SEM) stubs using adhesive carbon tabs. Samples were coated with a thin film of platinum to ensure conductivity.

Scanning electron microscope mixed field images of samples 28 and 32 showed that the general morphology (for example, undulating topography) of the ethanol based coating and the isopropanol based coating was mostly unchanged in the toughened samples compared to the 'as-deposited' samples, with only some minor rippling of the coating being evident. As expected, comparison of dark field images revealed that more abrupt edges/cracks/delaminated regions were found on toughened samples compared to the 'as deposited' non-toughened samples but that same were acceptable.

9. Surface Topography Analysis of Roller Coated Sample Following Toughening

The topography of sample 33 which comprised a silica/aluminium matrix coating layer derived from TEOS with dispersed copper particles deposited onto float glass by roller coating, was investigated.

Scanning electron microscopy studies were employed to analyse the distribution of the copper particles in relation to the silica matrix coating layer. Specimens were taken from silica matrix coating layer samples and mounted onto aluminium stubs before coating with a thin layer of platinum (which provides a uniform conductive surface) prior to examination using a scanning electron microscope (SEM). Images were collected using of 5, 15 and 30 kV and a spot size of 4.5 to determine the location of the copper particles with respect to the coating.

To improve surface sensitivity, 'beam deceleration' (BD) mode was used, with an accelerating voltage of 5 kV and stage bias of 500V and accelerating voltage of 8 kV and stage bias of 4 kV. 'Concentric back-scattered' (CBS) and 'through-the-lens' detectors (TLD) were used in the beam deceleration (BD) mode.

A series of low magnification backscattered electron (BSE) images of the sample surface collected with increasing beam voltage (5 kV (surface sensitive) to 30 kV (most penetrating)). The BSE images provided information regarding the chemical composition of the sample, and all images of the samples showed material with a high average atomic number, brighter in contrast on the image, and therefore indicative of copper.

The imaging with various beam voltages was used to determine the distribution of the copper particles with respect to the silica matrix layer. Close examination revealed brighter contrast particles apparent on the BSE images taken at 5 and 15 kV indicating the presence of copper on the surface of the silica. For images taken at 30 kV (most penetrating condition), particles were less apparent at the brighter contrast but nevertheless apparent, indicating the presence of copper with the silica matrix layer.

High magnification revealed in a secondary electron (SE) image an agglomeration of copper particles approximately 4 μm in width.

Ultra-high resolution imaging (using TLD with BD) was employed to determine the presence of sub-micron copper particles. As expected, the copper particles appeared bright in contrast in the BSE image. The copper particles also appeared circular and elongate. The particles were in the region of 35 to 100 nm in size and agglomerated to larger particles in the region of 1 μm to 4 μm.

10. Summary in Relation to Points 1 to 9

Based on the investigations described above in points 1 to 9 in relation to the present invention, it has been found that a coating of copper particles and silica derived from for example TEOS and deposited onto a glass substrate is able to destroy pathogens through surface contact.

11. Spin Coated Samples Provided with Different Concentrations of Copper Particles in a Silica Matrix Coating Layer, Followed by Heat Treatment The studies described above illustrate that the introduction of copper particles into a silica matrix coating layer provides improved antibacterial performance. The following experiments investigate the effect of increased copper concentrations on antibacterial performance for spin coated samples.

Spin coated samples produced using a 1.5 weight % silica coating solution, with different concentrations of copper particles, ranging from 85 to 8500 ppm (by weight in coating solution) were investigated.

To prepare the samples, a 10% by weight silica solution was first prepared by hydrolysing tetraethyl orthosilicate (TEOS) in isopropyl alcohol (IPA) and deionised water, with 1M hydrochloric acid as the catalyst for the sol gel reaction. The solution was stirred for 4 hours at room temperature. This solution was then combined with 10,000 ppm copper dispersion in isopropyl alcohol (IPA), and the appropriate amount of isopropyl alcohol (IPA) to achieve the final silica and copper concentrations specified in Table 9.

TABLE 9

| Sample | Solvent | SiO$_2$ concentration weight % | Copper concentration (ppm) |
|---|---|---|---|
| 36 | IPA | 1.5 | 0 |
| 37 | IPA | 1.5 | 85 |
| 38 | IPA | 1.5 | 850 |
| 39 | IPA | 1.5 | 1000 |
| 40 | IPA | 1.5 | 4250 |
| 41 | IPA | 1.5 | 8500 |

An ultrasonic bath and vortex mixer were employed prior to coating each sample onto a glass substrate to ensure the copper particles remained in suspension. Each coating solution (2 ml), was then pipetted onto a 10 cm by 10 cm glass substrate using a spin coater set to the following parameters:
 i) acceleration time 0.4 seconds,
 ii) spin time 20 seconds,
 iii) spin speed 2000 rpm,
 iv) deceleration time 0.4 seconds.

Following application, the substrates were heat treated at 200° C. for 1 hour. A further heat treatment at 650° C. followed, to simulate a toughening cycle.

11i). Optical Measurements of Spin Coated Samples 36 to 41

Float glass substrate samples (Pilkington Optifloat™) (10 cm×10 cm), provided with a silica matrix coating layer derived from tetraethyl orthosilicate (TEOS) with copper particles (samples 36 to 41), were tested for optical performance, using a Gardner haze-gard plus and a Hunter Lab UltraScan Pro. The results of the testing are provided in Table 10.

Figure 2:
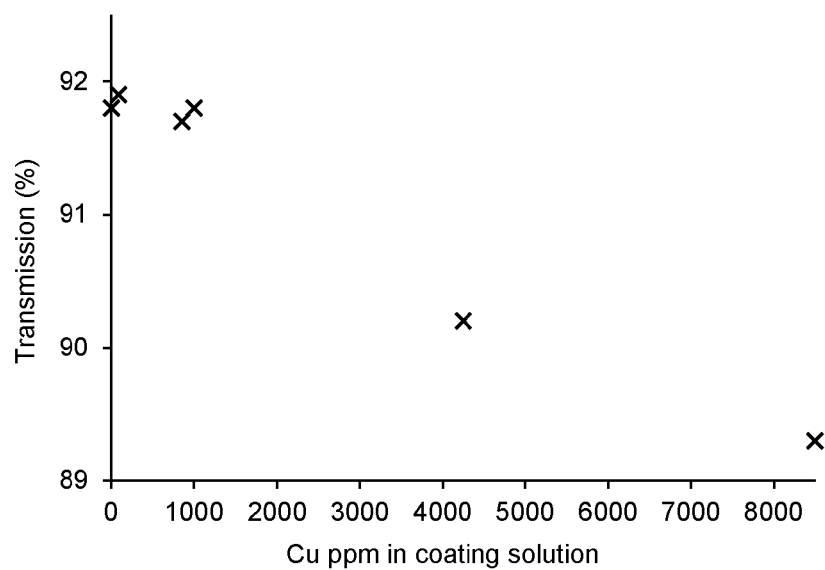
FIG. 2—illustrates the transmittance measurements versus copper concentration for samples 36 to 41.
Figure 3:
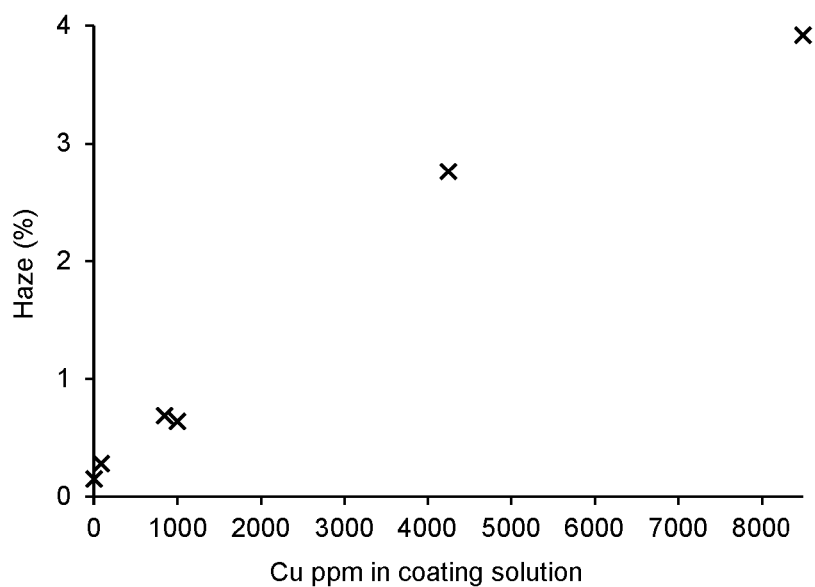
FIG. 3—illustrates the haze measurements recorded versus copper concentration for samples 36 to 41.

It can be seen from FIGS. 1 to 3 how increasing the copper concentration effects the reflected colour, transmission and haze measurements of the spin coated samples.

TABLE 10

Optical properties for samples 36 to 41, prior to 650° C. heat treatment.

| Sample Number | Copper concn. (ppm) | Haze (%) | Transmittance (%) | Reflectance (%) | a* (D65/2) | b* (D65/2) |
|---|---|---|---|---|---|---|
| 36 | 0 | 0.15 | 91.80 | 7.65 | −0.43 | −0.35 |
| 37 | 85 | 0.28 | 91.90 | 7.43 | −0.47 | −0.25 |
| 38 | 850 | 0.69 | 91.70 | 7.57 | −0.41 | −0.25 |
| 39 | 1000 | 0.64 | 91.80 | 7.49 | −0.39 | −0.38 |
| 40 | 4250 | 2.76 | 90.20 | 7.88 | −0.04 | −0.27 |
| 41 | 8500 | 3.92 | 89.30 | 7.87 | 0.54 | 0.32 |

11ii). Surface Analysis of Spin Coated Samples 37 to 41

Figure 4:
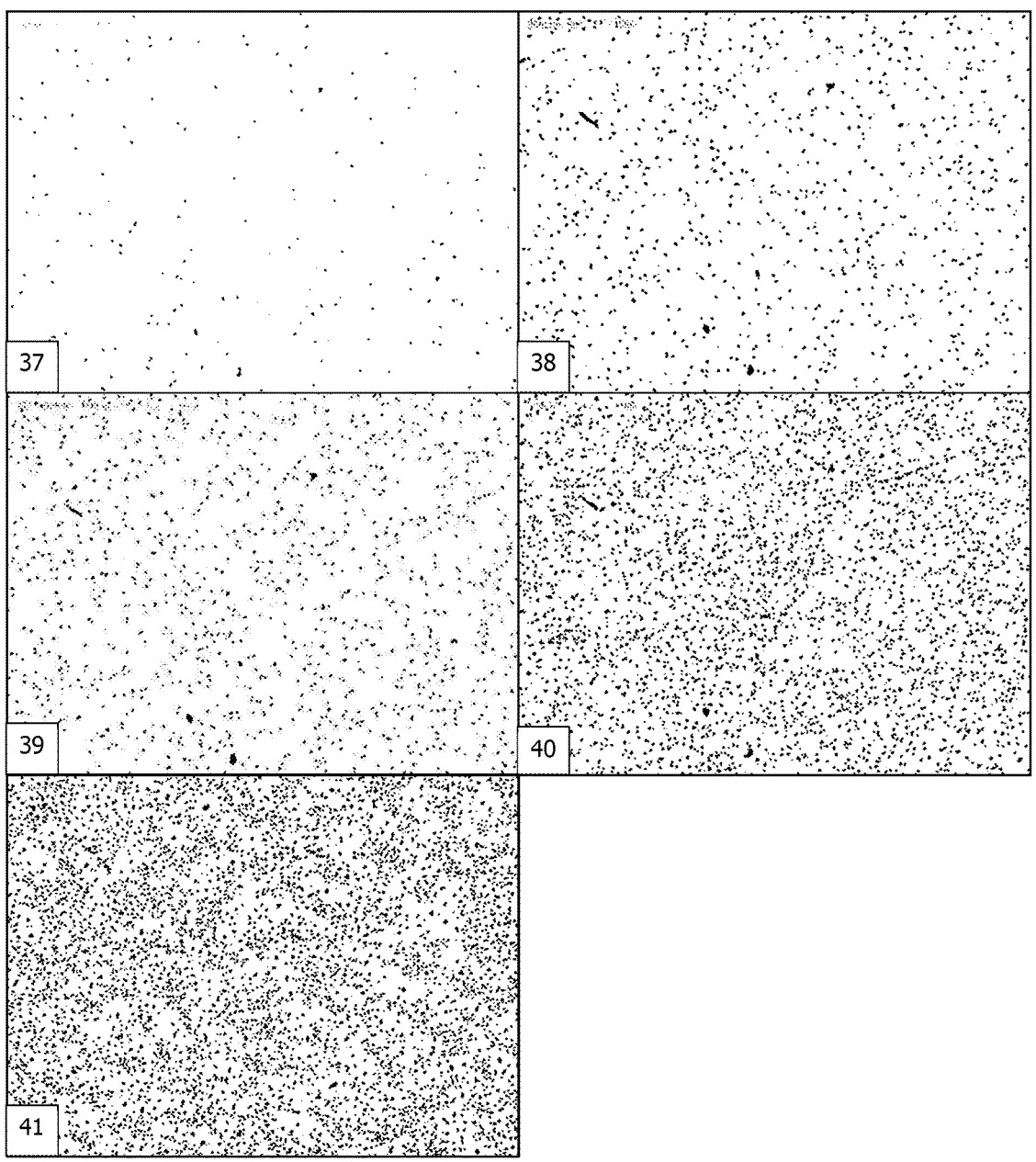
FIG. 4—illustrates the optical microscopy images obtained for spin coated samples 37 to 41.
Figure 5:
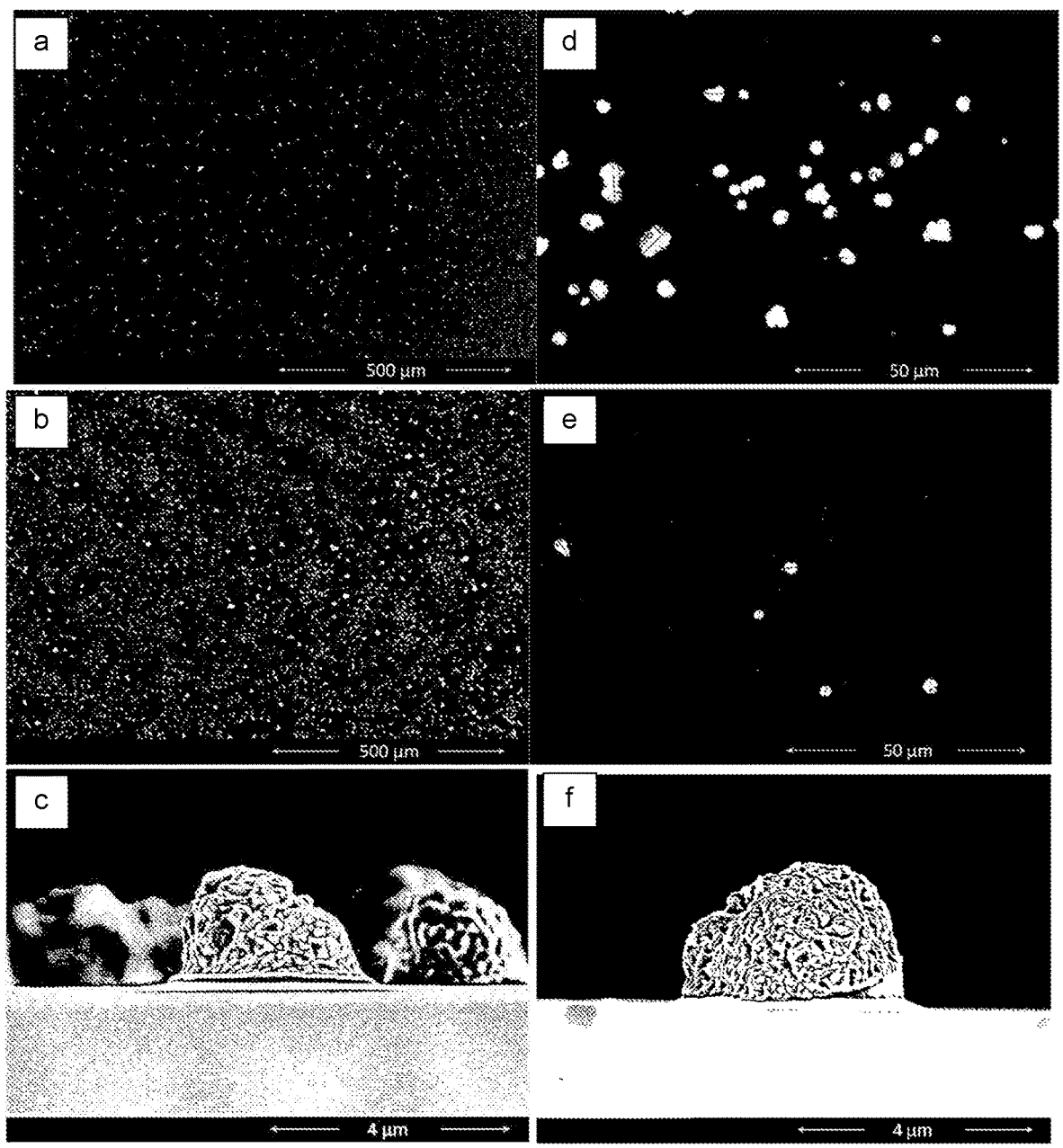
FIG. 5—illustrates the SEM images obtained for sample 41 (8500 ppm Copper) (images a, b and c) and sample 38 (850 ppm Copper) (images d, e and f), with the copper particles in FIGS. 5c and 5f, protruding from the silica matrix coating layer.

The resultant coatings (37 to 41) were analysed under an optical microscope, and the images taken for each sample are shown in FIG. 4, illustrating the change in the distribution of the copper particles on and within the silica coating, at different copper concentrations.

Figure 6:
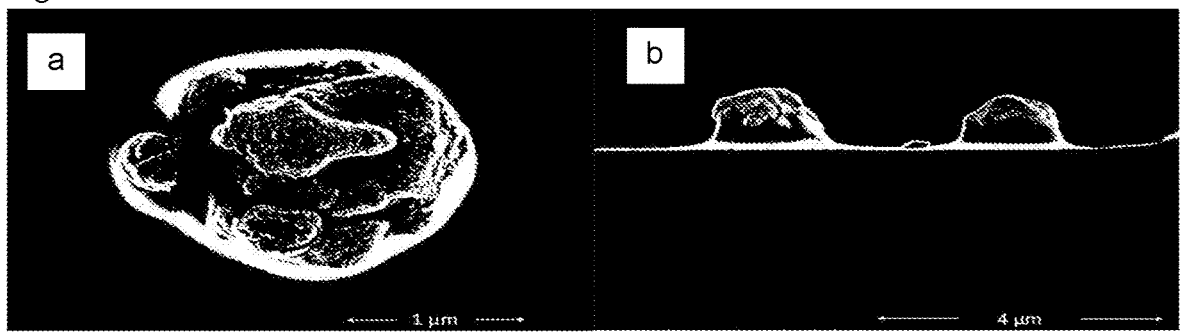
FIG. 6—illustrates the SEM images obtained for copper particles after an initial 200° C. cure, but prior to 650° C. cure, with the copper particles protruding from the silica matrix coating layer.

Scanning electron microscopy studies were also employed to analyse the appearance and distribution of the copper particles in relation to the silica matrix coating layer. Coated samples were taken and mounted onto aluminium stubs before coating with a thin layer of platinum (which provides a uniform conductive surface) prior to examination using a scanning electron microscope (SEM). Images of samples 41 and 38 following a 650° C. heat treatment are shown in FIGS. 5a to c and FIGS. 5d to f respectively. These images illustrate the difference in the distribution of copper between 8500 ppm and 850 ppm copper concentrations. FIGS. 6a and 6b illustrate images of the individual copper particles before a 650° C. heat treatment.

11iii). Antibacterial Assessment of Spin Coated Samples 36, 37 and 41

Antibacterial testing of spin coated samples 36, 37 and 41 was conducted at York University, employing an imaging method that uses maximum intensity projections. The imaging method and images produced are able to show whether individual bacteria (for example, E. coli cultures) are alive or dead, using the fluorescence of two different stains. The Syto9 stain (green) is able to enter any bacterial cell, while Propidium Iodide (red) is only able to enter cells with damaged membranes, which may therefore be considered dead for the purposes of the present investigation. That is, a cell generally fluoresces green if alive and red if dead.

To conduct the tests, 10 µL of E. coli culture, mixed with the stains, was deposited onto samples 36, 37 and 41. A coverslip was placed on top of each sample, sealed with silicone grease and incubated for 24 hours at 37° C. in a humid chamber. Following testing of the samples, the resulting images (looking at live and dead bacteria) illustrated that sample 41 (8500 ppm of copper particles) performed best, that is, indicated the most successful antibacterial kill, whilst sample 37 (85 ppm of copper particles) showed little improvement in the bacterial kill performance relative to sample 36 (with no copper particles present). Based on these initial findings and the above optical results and also, given the required balance between optical and antibacterial performance, further testing was conducted using a roller coating process with a copper concentration of 1000 ppm copper.

12. Depositions of Silica Matrix Coating Layer and Copper Particles by Roller Coating Followed by Heat Treatment Following the Testing of Previous Samples (1 to 35) and (36 to 41)

Building on the findings from earlier samples (1 to 35) and samples (36 to 41), samples 42 to 91 were prepared to evaluate the durability, optical performance and antimicrobial effectiveness of copper particles encapsulated in a silica matrix coating layer derived from tetraethyl orthosilicate (TEOS), applied by roller coating to a float glass substrate.

In each of the experiments, the roller coated apparatus used to produce the samples for testing was a Burkle easy-Coater RCL-M 700 Roller Coater. Each coating was applied individually to a glass substrate with dimensions 30 cm by 40 cm. After the coating was applied, the substrate was immediately heated in a Memmert drying oven at a temperature of 200° C. to cure the coatings. To further densify the silica matrix coating layer and simulate glass toughening processes, a heat treatment at 650° C. was applied to half of the samples produced. The results of the process are illustrated in Table 11.

TABLE 11

| Sample | Coating Substrate | composition based on | Curing | Result |
|---|---|---|---|---|
| Samples 42 to 58 | Pilkington Optiwhite™ glass | i) copper particles in isopropyl alcohol ii) TEOS in diacetone alcohol/propylene glycol mixture. | 1 hour at 200° C. | Good appearance |
| Samples 62 to 81 | Pilkington Optiwhite™ glass | i) copper particles in isopropyl alcohol ii) TEOS in diacetone alcohol/propylene glycol mixture. | 1 hour at 200° C. and 5 mins at 650° C. | Good appearance |
| Samples 82 to 86 | Pilkington Optifloat™ glass | i) copper particles in isopropyl alcohol ii) TEOS in diacetone alcohol/propylene glycol mixture. | 1 hour at 200° C. | Good appearance |
| Samples 87 to 91 | Pilkington Optifloat TM glass | i) copper particles in isopropyl alcohol ii) TEOS in diacetone alcohol/propylene glycol mixture. | 1 hour at 200° C. and 5 mins at 650° C. | Good appearance |

To prepare samples 42 to 91, a 10% by weight silica solution was first prepared by hydrolysing tetraethyl orthosilicate (TEOS) in diacetone alcohol, propylene glycol and deionised water, with 1M hydrochloric acid as the catalyst for the sol gel reaction. The solution was stirred for 4 hours at room temperature. The solution was then diluted to form a 2.5 weight % silica mixture with 1000 ppm copper, by adding the appropriate amounts of diacetone alcohol, propylene glycol and 10,000 ppm copper dispersion in isopropyl alcohol (IPA).

Each silica coating composition sample (42 to 91) was then produced by pumping the diluted solution into a channel on the roller coater, between the doctor roller, application roller and sealing end plates. Each solution coated the application roller which in turn applied the solution to a glass substrate. As indicated in Table 11, the glass substrate for samples 42 to 91 comprised soda-lime silicate glass such as float glass available from NSG. A typical soda-lime silicate glass composition comprises by weight for example: $SiO_2$ 69-74%; $Al_2O_3$; $Na_2O$ 10-16%; $K_2O$ 0-5%; MgO 0-6%; CaO 5-14%; $SO_3$ 0-2%; and $Fe_2O_3$ 0.005-2%.

Prior to roller coating, the glass substrates were cleaned in a flat-bed washing machine. Following coating all samples were thermally cured at 200° C. for an hour in a convection oven to produce a silica matrix coating layer. Half of the samples from each substrate set were then subjected to a further high temperature heat treatment at 650° C. for 5 minutes to simulate heat toughening conditions. The roller coating conditions are provided in Table 12.

TABLE 12

Roller coating parameters used to produce samples 42 to 91.

| Sample | Substrate | Pinch (mm) between application and doctor rollers | Compression (mm) between application roller and glass substrate | Roller Speeds (m/min) Application, doctor and transport |
|---|---|---|---|---|
| 42 to 81 | Pilkington Optiwhite™ | 1.0 | 0.6 | 3.0 |
| 82 to 91 | Pilkington Optifloat™ | 1.0 | 0.6 | 3.0 |

13. Optical Performance Testing of Roller Coated Samples

Pilkington Optiwhite™ and Pilkington Optifloat™ glass substrate (10 cm×10 cm) samples (36, 56, 76 and 81), provided with a silica matrix coating layer derived from tetraethyl orthosilicate (TEOS) with 1000 ppm copper particles, were tested for optical performance, by a Gardner haze-gard plus and a HunterLab UltraScan Pro. The results of the testing are provided in Tables 13 and 14.

TABLE 13

Haze-gard measurements.

| | Haze (%) | | Transmission (%) | |
|---|---|---|---|---|
| Sample Number | Mean | Std Dev | Mean | Std Dev |
| Sample 42-Left side | 0.42 | 0.05 | 93.5 | 0.00 |
| Sample 42a-Centre | 0.41 | 0.05 | 93.5 | 0.00 |
| Sample 42b-Right side | 0.38 | 0.05 | 93.5 | 0.00 |
| Sample 62-Left side | 0.21 | 0.00 | 93.2 | 0.00 |
| Sample 62a-Centre | 0.19 | 0.00 | 93.2 | 0.00 |
| Sample 62b-Right side | 0.19 | 0.02 | 93.3 | 0.00 |
| Reference-Pilkington Optiwhite™ | 0.07 | 0.00 | 93.1 | 0.00 |
| Reference-Pilkington Optiwhite™ heat treated at 650° C. | 0.08 | 0.00 | 93.1 | 0.04 |
| Sample 82-Left side | 0.29 | 0.00 | 92.2 | 0.00 |
| Sample 82a-Centre | 0.45 | 0.06 | 92.2 | 0.00 |
| Sample 82b-Right side | 0.42 | 0.05 | 92.3 | 0.00 |
| Sample 87-Left side | 0.22 | 0.00 | 92.0 | 0.05 |
| Sample 87a-Centre | 0.19 | 0.00 | 92.0 | 0.00 |
| Sample 87b-Right side | 0.21 | 0.00 | 91.9 | 0.04 |
| Reference-Pilkington Optifloat™ | 0.08 | 0.00 | 91.6 | 0.00 |
| Reference-Pilkington Optifloat™ heat treated at 650° C. | 0.09 | 0.00 | 91.5 | 0.05 |

As can be seen from Table 13, all samples tested were shown to have an acceptable mean haze value of 0.5 or less. Likewise, all transmission values were acceptable with values greater than 90%.

TABLE 14

Ultrascan measurements.

| Sample Description | Reflected Colour a* D65/2 | Reflected Colour b* D65/2 | Reflectance (%) Y D65/2 | Transmittance (%) Y D65/2 |
|---|---|---|---|---|
| Sample 42-Left Side | −0.14 | −0.21 | 7.08 | 91.56 |
| Sample 42-Centre | −0.16 | −0.23 | 7.08 | 91.61 |
| Sample 42-Right Side | −0.15 | −0.16 | 7.03 | 91.61 |
| Sample 62-Left Side | −0.14 | −0.56 | 7.2 | 91.47 |
| Sample 62-Centre | −0.12 | −0.57 | 7.2 | 91.46 |
| Sample 62-Right Side | −0.12 | −0.51 | 7.15 | 91.48 |
| OptiWhite Ref. 200° C. | −0.12 | −0.83 | 7.58 | 91.14 |
| OptiWhite Ref. 650° C. | −0.15 | −0.82 | 7.39 | 91.35 |
| Sample 82-Left Side | −0.44 | −0.28 | 7.01 | 90.46 |
| Sample 82-Centre | −0.39 | −0.33 | 7.03 | 90.47 |
| Sample 82-Right Side | −0.34 | −0.3 | 7 | 90.52 |
| Sample 87-Left Side | −0.43 | −0.49 | 7.03 | 90.27 |
| Sample 87-Centre | −0.44 | −0.58 | 7.09 | 90.29 |
| Sample 87-Right Side | −0.44 | −0.6 | 7.12 | 90.26 |
| OptiFloat Ref. 200° C. | −0.44 | −0.93 | 7.7 | 89.69 |
| OptiFloat Ref. 650° C. | −0.45 | −0.93 | 7.44 | 89.94 |

Figure 7:
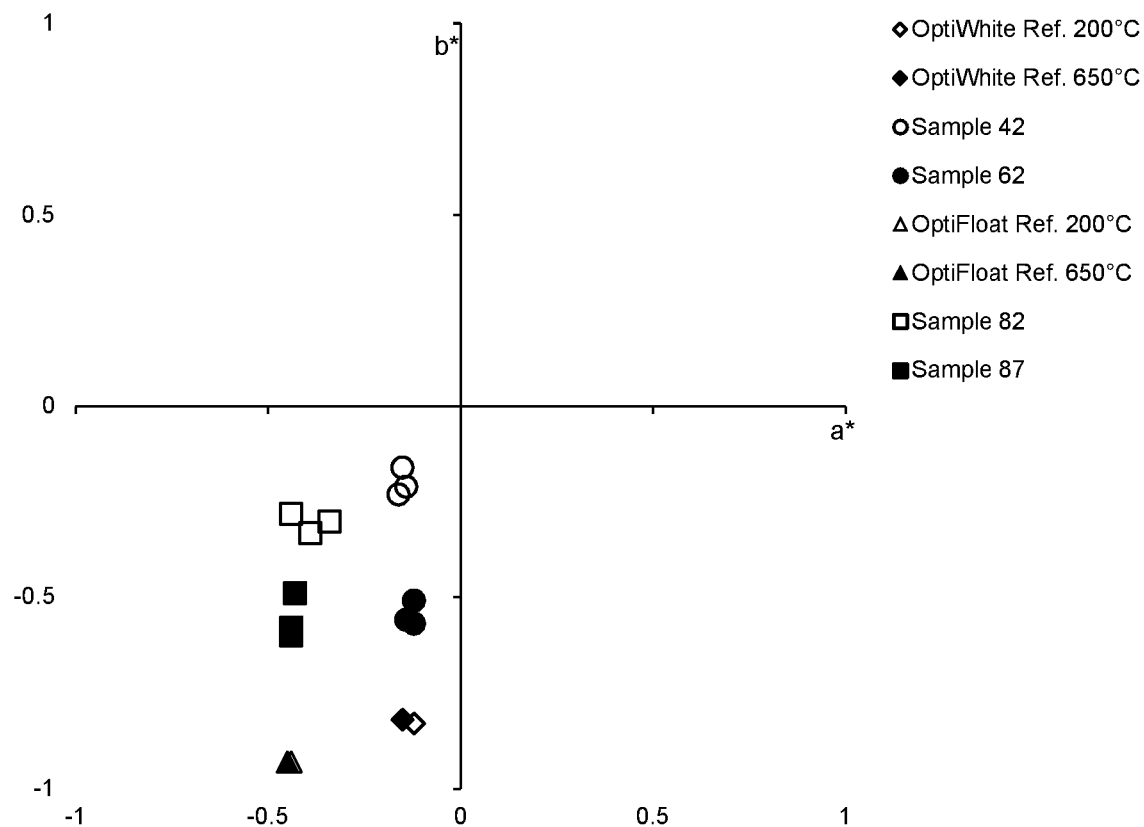
FIG. 7—illustrates UltraScan measurements showing the a* and b* values for the reflected colour of two different substrates with the coating cured at 200° C. and 650° C.

The a* and b* results provided in Table 14 are also illustrated in FIG. 7. Preferably, the a* values are in the range 0 to −3.00, and the b* values are in the range 2.00 to −2.00, as this provides a suitable colouration for the coated glass and enables the coated glass if required to be used side by side with uncoated glass material. In addition, the values indicate that the coatings are of uniform thickness.

Figure 8:
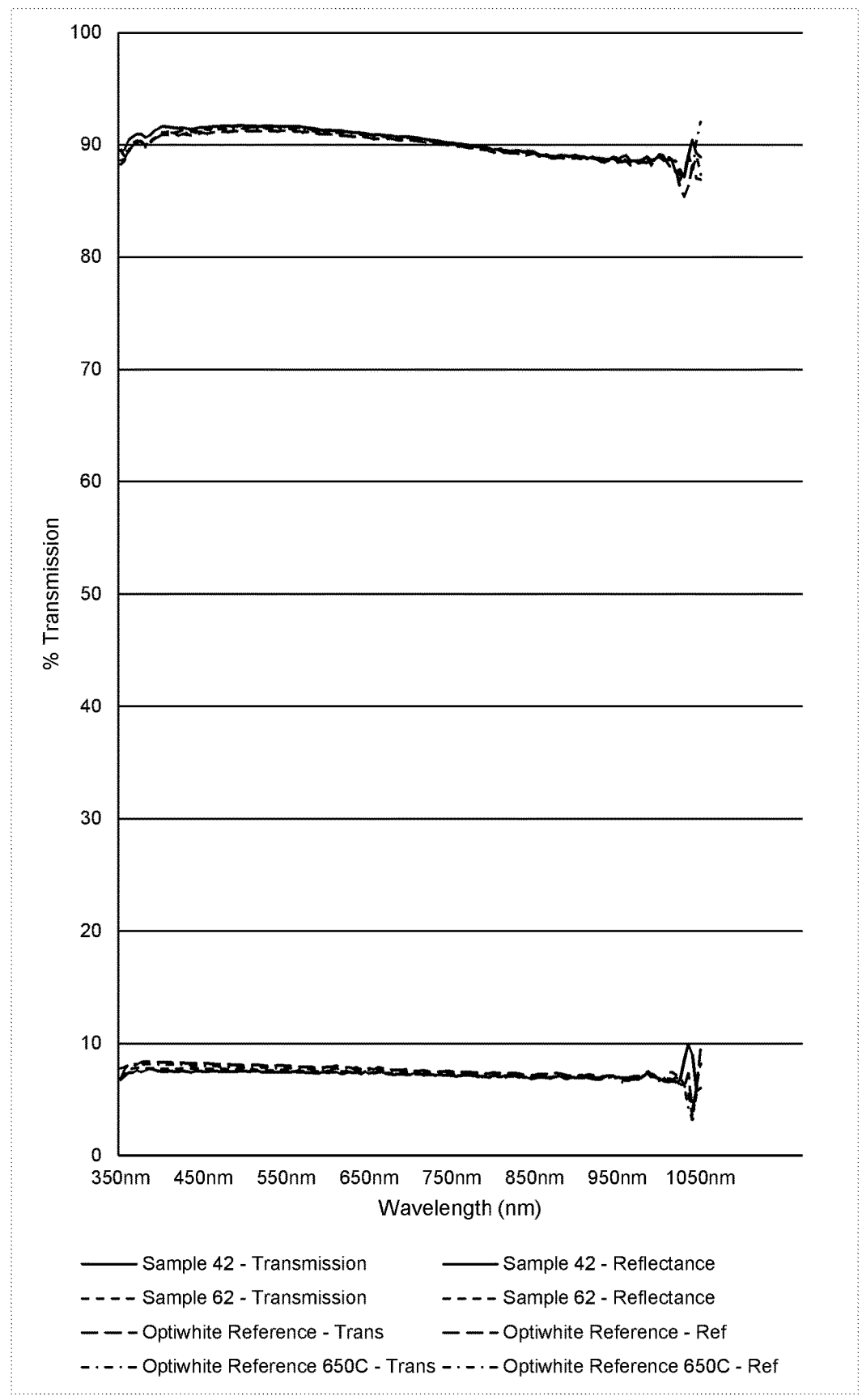
FIG. 8—illustrates the transmission and reflection measurements at different wavelengths for the roller coated samples and uncoated glass samples.

FIG. 8 illustrates the transmission and reflection measurements at different wavelengths for the roller coated samples and uncoated glass samples. The similarity in the transmission and reflection measurements for the samples is also apparent from FIG. 8. That is, there is little to no change in optical performance across the full range of wavelengths measured, that is 350 to 1050 nm.

14. Functional Testing of Roller Coated Samples

Pilkington Optiwhite™ and Pilkington Optifloat™ glass substrate (10 cm×10 cm) samples (42 and 62, in duplicate), provided with a silica matrix coating layer derived from tetraethyl orthosilicate (TEOS) with 1000 ppm copper particles were tested for contact angle using an FTA 200, with de-ionised water and hexadecane. The results of this testing are in Tables 15 and 16.

TABLE 15

Deionised Water

| Sample | Contact Angle (°) 1 | 2 | 3 | Average |
|---|---|---|---|---|
| Sample 42 | 45.47 | 51.29 | 46.45 | 47.74 |
| Sample 42a | 46.48 | 48.54 | 50.05 | 48.36 |
| Sample 62 | 41.58 | 50.73 | 43.18 | 45.16 |
| Sample 62a | 29.31 | 29.36 | 27.62 | 28.76 |

In respect of the contact angle measured with deionised water, a value of less than 90 degrees is considered to be acceptable and an indication of good wettability.

TABLE 15

Hexadecane

| Sample | Contact Angle (°) 1 | 2 | 3 | Average |
|---|---|---|---|---|
| Sample 42 | 10.46 | 8.12 | 8.74 | 9.11 |
| Sample 42a | 16.22 | 12.50 | 13.21 | 13.98 |
| Sample 62 | 9.29 | 15.49 | 9.76 | 11.51 |
| Sample 62a | 6.92 | 9.26 | 10.34 | 8.84 |

In respect of the contact angle measured with hexadecane, a value of less than 90 degrees is considered to be acceptable for a hydrophobic material.

Samples 42 and 62 (in duplicate) (cut down to 10×10 cm samples) were also tested with a dyne pen for surface energy testing and the results are provided in Table 17.

TABLE 17

Dyne Pen

| Sample | Result dyn/cm |
|---|---|
| Sample 42 | 36 |
| Sample 42a | 36 |
| Sample 62 | 60 |
| Sample 62a | 64 |

The Dyne pen was applied to the surface of the coated glass substrate. For sample 42 (in duplicate, 42 and 42a) the dyne value was less than for sample 62 (in duplicate, 62, 62a), indicating that the ink was more readily removed.

Samples 43 and 63 were subject to a Coating friction test (20×20 cm samples). The results of the test are provided in Table 18 along with a float glass sample reference.

TABLE 18

Friction test

| Sample | Result |
|---|---|
| Sample 43 | demonstrated low coefficient of friction once slip potential reached |
| Sample 63 | demonstrated low coefficient of friction once slip potential reached |
| Pilkington Optiwhite ™ Reference | Low angle slip potential but high degree of friction exhibited |

13. Durability Testing of Roller Coated Samples

EN1096 Class A and B

Pilkington Optiwhite™ glass substrate samples provided with a silica matrix coating layer derived from tetraethyl orthosilicate (TEOS) with 1000 ppm copper particles (samples as indicated), were tested for relative durability (or deterioration) by being subjected to cycles of SO₂, condensation, salt spray and abrasion in accordance with EN1096 Class A and EN1096 Class B incorporated herein by reference. The results of the tests are provided in Tables 19 to 26.

TABLE 19

EN1096 Class A, SO₂

| Sample description | SO₂ | Comments |
|---|---|---|
| Sample 44 (6 10 × 15 cm) | 5 cycles | No visual changes observed-Pass |
| Sample 64 (6 10 × 15 cm) | 5 cycles | No visual changes observed-Pass |

TABLE 20

EN1096 Class B, SO$_2$

| Sample description | SO$_2$ | Comments |
|---|---|---|
| Samples 44 + 45 (6 10 × 15 cm) | 1 cycle | No visual changes observed-Pass |
| Samples 64 + 65 (6 10 × 15 cm) | 1 cycle | No visual changes observed-Pass |

TABLE 21

EN1096 Class A, Condensation

| Sample description | Condensation | Comments |
|---|---|---|
| Samples 45 + 46 (6 10 × 15 cm) | 21 days | Thinning of coating-Fail |
| Samples 65 + 66 (6 10 × 15 cm) | 21 days | Thinning of coating-Fail |

TABLE 22

EN1096 Class B, Condensation

| Sample description | Condensation | Comments |
|---|---|---|
| Sample 47 (6 10 × 15 cm) | 4 days | No visual changes observed-Pass |
| Sample 67 (6 10 × 15 cm) | 4 days | No visual changes observed-Pass |

TABLE 23

EN1096 Class A, Salt Spray

| Sample description | Salt Spray | Comments |
|---|---|---|
| Samples 47 + 48 (6 10 × 15 cm) | 21 days | Thinning and loss of coating-Fail |
| Samples 67 + 68 (6 10 × 15 cm) | 21 days | Thinning and loss of coating-Fail |

TABLE 24

EN1096 Class B, Salt Spray

| Sample description | Salt Spray | Comments |
|---|---|---|
| Sample 48 + 49 (6 10 × 15 cm) | 10 days | Thinning and loss of coating-Fail |
| Sample 67 + 69 (6 10 × 15 cm) | 10 days | Thinning and loss of coating-Fail |

TABLE 25

EN1096 Class A, Abrasion

| Sample description | Abrasion | Comments |
|---|---|---|
| Samples 50 (1 30 × 30 cm) | 500 strokes | Abraded area uniformed but barely visible-Pass |
| Samples 70 (1 30 × 30 cm) | 500 strokes | Abraded area uniformed but barely visible-Pass |

TABLE 26

EN1096 Class B, Abrasion

| Sample description | Abrasion | Comments |
|---|---|---|
| Samples 51 (1 30 × 30 cm) | 50 strokes | Abraded area uniformed but barely visible-Pass |
| Samples 71 (1 30 × 30 cm) | 50 strokes | Abraded area uniformed but barely visible-Pass |

Cleaning Agent Compatibility

Pilkington Optiwhite™ glass substrate samples as indicated in Table 28, provided with a silica matrix coating layer derived from tetraethyl orthosilicate (TEOS) with 1000 ppm copper particles were tested for relative durability (or deterioration) by being subjected to 6000 cycles of cleaning agent action from a modified oil rub rig with a load of 1 Kg on the coated surface. For the tests, each sample was heated for 5 minutes at 650° C. To apply the cleaning agent, a multi-purpose microfibre cloth, 8×9 cm pieces (88% polyester/12% polyamide), were used, attached to a modified jig and wetted with cleaning agent as required during the run. The glass cleaner used was ultra-pure glass cleaner, available from Nationwide Hygiene Group. At the end of each test, samples were rinsed in deionised water and wiped dry. A summary of the condition is provided in Table 27. The results of the tests are provided in Table 28.

TABLE 27

Cleaning Agent Description

| Cleaning Agent | |
|---|---|
| Isopropyl alcohol (IPA) | Each cleaning agent applied to microfibre cloth; tests conducted on modified oil rub rig, 6000 strokes, 1 Kg load. |
| Water | |
| Detergent (10 parts water, 1 part detergent pH 7.58) | |
| Glass cleaner (pH 11.05) | |
| Bleach (2 parts water, 1 part bleach pH 12.08) | |

TABLE 28

Cleaning Agent Results

| Cleaner | Sample No | Pass/Fail | Comments on Appearance |
|---|---|---|---|
| Dry | 52 | Pass | No marks |
|  | 72 | Pass | No marks |
| IPA | 52 | Pass | No marks-no flash rusting marks on cloth |
|  | 72 | Pass | No marks-no flash rusting marks on cloth |

TABLE 28-continued

| Cleaner | Sample No | Pass/Fail | Comments on Appearance |
|---|---|---|---|
| Water | 52 | Pass | No marks-no flash rusting marks on cloth |
|  | 72 | Pass | No marks-no flash rusting marks on cloth |
| Detergent | 52 | Pass | No marks-no flash rusting marks on cloth |
|  | 72 | Pass | No marks-no flash rusting marks on cloth |
| Glass Cleaner | 52 | Pass | No marks-no flash rusting marks on cloth |
|  | 73 | Pass | No marks-no flash rusting marks on cloth |
| Bleach | 53 | Pass | No marks-no flash rusting marks on cloth |
|  | 73 | Pass | No marks-no flash rusting marks on cloth |

Scratch Testing—Pin on Disc

Pilkington Optiwhite™ glass substrate samples provided with a silica matrix coating layer derived from: tetraethyl orthosilicate (TEOS) with 1000 ppm copper particles (Samples 53 and 73, 10×10 cm), were tested for relative scratch resistance of the coating. An Erichsen model 314 universal scratch tester was used to investigate the resilience of the silica matrix coating layers prepared according to the present invention to scratching. The test uses a metal stylus and a turntable to which is applied a sample to be tested. The turntable is rotated, and a downward force applied and increased until scratches are visible on the coated substrate. Table 29 provides details of the samples tested and the scratch test results.

TABLE 29

Pin on disc results for 0.75 mm diameter Tungsten Carbide Tip.

| Sample No | Load at which first broken scratch appears (N) | Load at which first continuous scratch appears (N) | Comments |
|---|---|---|---|
| 53 | >10 | >10 | No scratches |
| 73 | 5 | >10 | No continuous scratch |

Humidity Testing

Pilkington Optiwhite™ substrate samples provided with a silica matrix coating layer derived from tetraethyl orthosilicate (TEOS) with 1000 ppm copper particles in isopropyl alcohol (IPA) (sample 54, in triplicate 54a, 54b, and 54c) were tested for relative durability (or deterioration) by being subjected to high temperature and high humidity conditions. The sample was placed in a Thermotron SM-8-7800 temperature and humidity cabinet and inspected after a set time in the cabinet. The conditions for the humidity testing are provided in Table 30. The results of the humidity testing are provided in Table 31.

TABLE 30

Conditions for Humidity Testing

| | Temperature C. | Humidity % | Time |
|---|---|---|---|
| Starting conditions | 30 | 30 | 0 |
| Ramp 1 | 30 to 70 | 30 | 30 minutes |
| Ramp 2 | 70 | 30 to 75 | 30 minutes |
| Hold | 70 | 75 | 30 hours |

TABLE 31

Humidity test results, for up to 30 hours

| Sample and number of hours in test | Number of defects per sample | Percentage of defects per sample | Total number of spots | Percentage increase in coating corrosion after 30 hours |
|---|---|---|---|---|
| 54a-Zero hours | 2 | 2.08 | 2 | — |
| 54b-Zero hours | 2 | 2.08 | 2 | — |
| 54c-Zero hours | 1 | 1.04 | 1 | — |
| 54a-Humidity 30 hours at 70° C., and 75% relative humidity | 1 | 1.04 | 1 | — |
| 54b-Humidity 30 hours at 70° C., and 75% relative humidity | 2 | 2.08 | 2 | — |
| 54c-Humidity 30 hours at 70° C., and 75% relative humidity | 1 | 1.04 | 1 | — |
| 54a - humidity tested for 30 hours at 70° C., and 75% relative humidity plus heat treated at 650° C. for 5 minutes | 4 | 4.17 | 4 | 3.16 |
| 54b - humidity tested for 30 hours at 70° C., and 75% relative humidity plus heat treated at 650° C. for 5 minutes | 1 | 1.04 | 1 | — |
| 54c - humidity tested for 30 hours at 70° C., and 75% relative humidity plus heat treated at 650° C. for 5 minutes | 2 | 2.08 | 2 | 1.05 |

14. Antibacterial Testing of Roller Coated Samples

The coated samples deposited by roller coating were assessed for antibacterial performance by University College London (UCL), UK using a standard protocol based on ISO 22916. The samples were tested against *Escherichia coli* (*E. coli* ATCC 8739) and *Staphylococcus aureus* (*S. aureus* ATCC 6538P) over various incubation times.

A series of antimicrobial testing protocols were conducted for:

i) the roller coated samples cured at only 200° C., and the roller coated samples cured at 200° C. further heat treated at 650° C., with short incubation times of 2 and 5 hours.

ii) the roller coated samples cured at 200° C. and further heat treated at 650° C., with an incubation time of 24 hours.

iii) the roller coated samples cured at 200° C., further heat treated at 650° C. and exposed to EN1096 durability testing, with an incubation time of 24 hours.

In accordance with ISO2216, the antibacterial activity (or log reduction), R, was calculated according to Formula 1. In addition, the percentage of bacteria killed with respect to both the untreated test specimens immediately after inoculation (% I) and the untreated test specimens after incubation time, t, (% R) were calculated according to Formulae 2 and 3:

$$R = \log_{10}(U_t) - \log_{10}(A_t) \quad \text{Formula 1}$$

$$\% R = \left(\frac{U_t - A_t}{U_t}\right) \times 100 \quad \text{Formula 2}$$

$$\% I = \left(\frac{U_0 - A_t}{U_0}\right) \times 100 \quad \text{Formula 3}$$

where $U_0$ is the average number of viable bacteria, in cells/cm², recovered from the untreated test specimens immediately after inoculation;

$U_t$ is the average number of viable bacteria, in cells/cm², recovered from the untreated test specimens after incubation time, t;

$A_t$ is the average number of viable bacteria, in cells/cm², recovered from the treated test specimens after incubation time, t.

14i). Antibacterial Testing of Roller Coated Samples (48 and 68) after 2 and 5 Hours The bacteria solutions were applied to the coated and uncoated samples, covered with a coverslip, and incubated at 37° C. and high humidity for the following incubation times: 2 hours for *Staphylococcus aureus*; and 5 hours for *Escherichia coli*. The results of the antimicrobial activity tests are provided in Tables 32 and Table 33. For each sample listed in the tables, testing was completed on three separate 2.5×2.5 cm specimens. Therefore, 6 specimens were tested in total for each coating type for both *E. coli* and *S. aureus*. The average results are provided.

TABLE 32

R Value, R and % I for *Escherichia coli* 8739-Incubation time 5 hours.

| Sample | R | % R | % I |
|---|---|---|---|
| Uncoated Reference | — | — | −37.51 |
| Sample 55 (mean) | 2.08 | 99.18 | 98.55 |
| Uncoated Reference | — | — | −0.14 |
| Sample 74 (mean) | 0.55 | 71.53 | 75.37 |

TABLE 33

R Value; % R and % I for *Staphylococcus aureus* 6538-Incubation time 2 hours.

| Sample | R | % R | % I |
|---|---|---|---|
| Uncoated Reference | — | — | 14.23 |
| Sample 56 (mean) | 3.15 | 99.93 | 99.95 |
| Uncoated Reference | — | — | 1.24 |
| Sample 75 (mean) | 1.24 | 94.26 | 94.70 |

The results show that when tested against *Escherichia coli* 8739 over 5 hours, the roller coated samples cured at 200° C. (Sample 55) has an average kill percentage relative to the uncoated reference of 98.55%. For the 650° C. cured samples (Sample 74), the kill percentage drops to 75.37%.

When tested against *Staphylococcus aureus* 6538 over 2 hours, the roller coated samples cured at 200° C. (Sample 56) has an average kill percentage relative to the uncoated reference of 99.33%. For the 650° C. cured samples (Sample 75), the kill percentage drops to 94.26%.

14ii). Anti-Bacterial Testing of Roller Coated Samples—24 Hours

The coated samples tested in this section were cured at 200° C. for 1 hour, followed by a 5 minute 650° C. heat treatment. The bacteria solutions were applied to the coated and uncoated samples, covered with a coverslip, and incubated at 37° C. and high humidity for 24 hours.

The results of the antimicrobial activity are provided in Table 34. For each sample listed in the table, testing was completed on three separate 2.5×2.5 cm specimens. Therefore, for each sample number, 9 specimens were tested in total for *E. coli* and 3 specimens tested for *S. aureus*. The mean results are provided.

TABLE 34

R value, % I and % R for *Escherichia coil* and *Staphylococcus aureus*. Incubation time 24 hours.

| Bacterial Strain | Sample | R | % R | % I |
|---|---|---|---|---|
| *E.Coli* 8739 | Uncoated Reference | — | — | 33.54 |
| | Sample 76 (mean) | 0.52 | 69.86 | 79.95 |
| *S.Aureus* 6538 | Uncoated Reference | — | — | 58.25 |
| | Sample 76 | 2.90 | 99.87 | 99.95 |

The results show that the roller coated samples with a 650° C. have a greater than 99% kill percentage relative to the 24-hour uncoated reference (>log 2 reduction) when tested against *Staphylococcus aureus* 6538. The kill percentage for *Escherichia coli* 8739 was lower, at 69.86%.

14iii). Anti-Bacterial Testing of Roller Coated Samples—Post Durability Tests The coated samples tested in this section were cured at 200° C. for 1 hour, followed by a 5 minute 650° C. heat treatment. They were then subjected to EN1096 durability tests, as described in section 13.

The results of the antimicrobial activity are provided in Tables 35 to 38. For each sample listed in the table, testing was completed on three separate 2.5×2.5 cm specimens. Therefore, for each sample number, 9 specimens were tested in total for *E. coli* and 3 specimens tested for *S. aureus*. The mean results are provided.

TABLE 35

Post EN1096 Abrasion Test (Class A)

| Bacterial Strain | Sample | R | % R | % I |
|---|---|---|---|---|
| *E.Coli* 8739 | Uncoated Reference | — | — | 33.54 |
| | Sample 70 (mean) | 0.11 | 21.51 | 49.91 |
| *S.Aureus* 6538 | Uncoated Reference | — | — | 58.25 |
| | Sample 70d | 1.73 | 98.14 | 99.22 |

TABLE 36

Post EN1096 SO₂ Test (Class A)

| Bacterial Strain | Sample | R | % R | % I |
|---|---|---|---|---|
| E.Coli 8739 | Uncoated Reference | — | — | 33.54 |
|  | Sample 64 (mean) | 0.49 | 67.90 | 80.13 |
| S.Aureus 6538 | Uncoated Reference | — | — | 58.25 |
|  | Sample 64d | 3.08 | 99.92 | 99.96 |

TABLE 37

Post EN1096 Condensation Test (Class B)

| Bacterial Strain | Sample | R | % R | % I |
|---|---|---|---|---|
| E.Coli 8739 | Uncoated Reference | — | — | 33.54 |
|  | Sample 67 (mean) | 0.44 | 63.61 | 80.41 |
| S.Aureus 6538 | Uncoated Reference | — | — | 58.25 |
|  | Sample 67d | 3.08 | 99.92 | 99.96 |

TABLE 38

Post EN1096 Salt Spray Test (Class B)

| Bacterial Strain | Sample | R | % R | % I |
|---|---|---|---|---|
| E.Coli 8739 | Uncoated Reference | — | — | 33.54 |
|  | Sample 69 (mean) | 0.11 | 23.22 | 48.83 |
| S.Aureus 6538 | Uncoated Reference | — | — | 58.25 |
|  | Sample 69d | 2.44 | 99.64 | 99.85 |

The results above show that when tested against *Staphylococcus aureus* 6538, the coated samples retain their greater than 99% kill percentage relative to the uncoated reference (>log 2 reduction), even after all EN1096 durability tests. When tested against *Escherichia coli* 8739, the coated samples that had undergone SO₂ and Condensation EN1096 tests retained similar antibacterial performance. For the samples that had undergone abrasion and salt spray EN1096 tests, the antibacterial performance dropped from 70% to 22% and 23% respectively. They still retained some antibacterial performance relative to the uncoated references however.

15. Surface Analysis of Roller Coated Samples

Scanning electron microscopy studies were employed to analyse the appearance and distribution of the copper particles in relation to the silica matrix coating layer. Coated samples were taken and mounted onto aluminium stubs before coating with a thin layer of platinum (which provides a uniform conductive surface) prior to examination using a scanning electron microscope (SEM).

Figure 9:
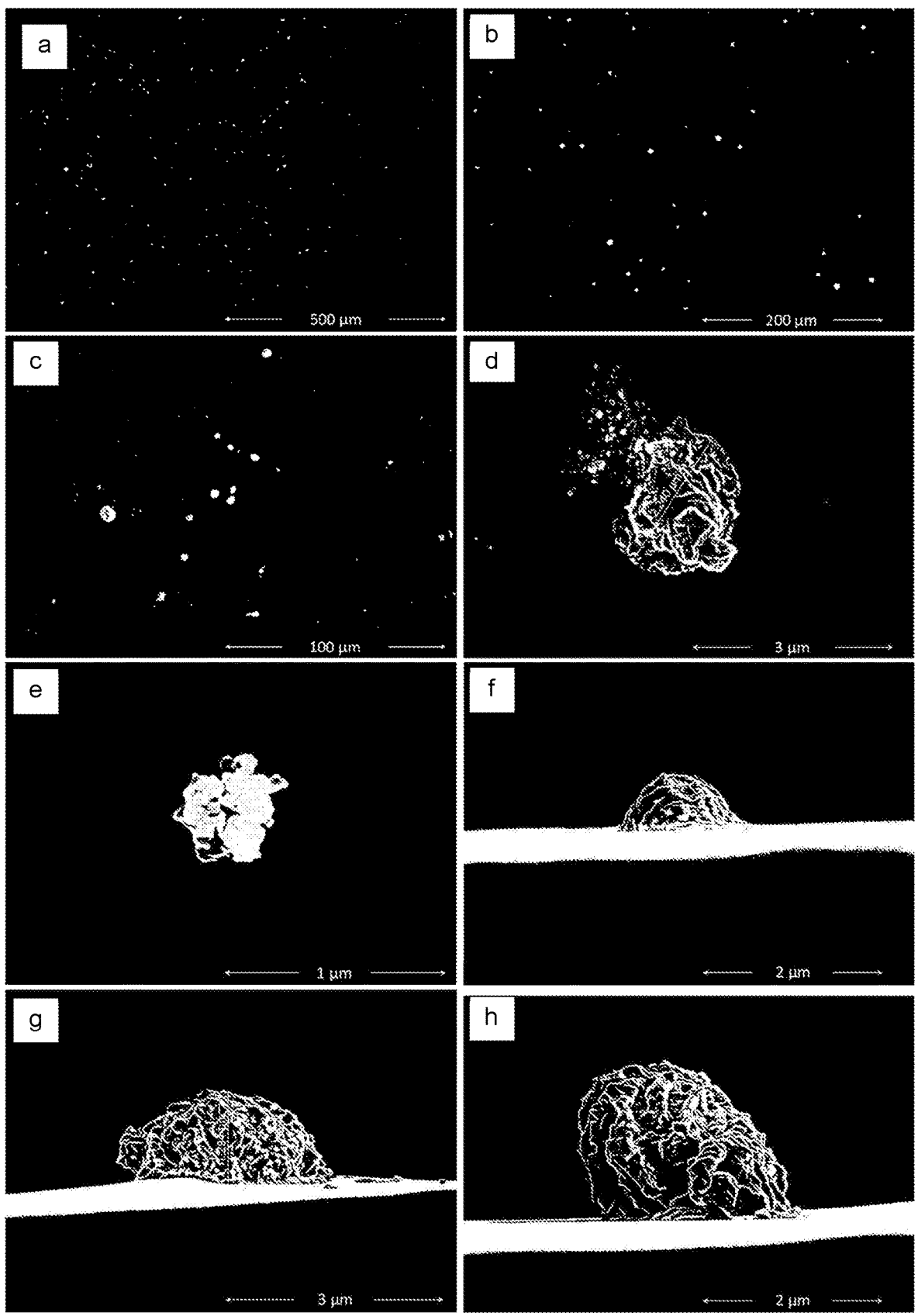
FIG. 9—illustrates the SEM images obtained for copper particles following deposition using roller coating.

FIGS. 9a to 9c illustrate the distribution of particles in plan view at different magnifications. FIGS. 9d and 9e illustrate the size, shape and structure of the individual particles in plan view. FIGS. 9f and 9h illustrate the size, shape and structure of the individual particles and/or agglomerations of particles in cross section view.

15. Leach Tests

Landfill Directive 24 h Leach Test—REACH Regulation Test

Leach test based on those described in Landfill directive 2003-33 (EN 12457). A sample was supplied as a crushed sample (>0.5 mm<10 mm) and 10 g aliquots were transferred to a 100ml bottle. 100 ml of distilled water was added and the sample rolled for 24 hours at room temperature. The crushed sample was then removed from the distilled water by filtration. 5% HCl was added and sample was analysed by ICP-OES. Testing was completed on Sample 57 (in duplicate, 57a, 57b) (1000 ppm copper roller coated sample with 200° C. cure), Sample 76 (in duplicate, 76a, 76b) (1000 ppm copper roller coated sample with 200° C. cure followed by 650° C.) and uncoated Pilkington Optiwhite™ references. The results in Table 39 show that no difference could be seen between either of the coated samples and the uncoated references.

TABLE 39

Results of REACH Regulation landfill directive test

| | Crushed sample (0.5-10 mm) 24 h leach in 100 ml DI Water | |
|---|---|---|
| Sample Identification | Sample mass (g) | Copper Detected (ppm) |
| Solution Blank |  | <0.01 |
| Uncoated Reference | 9.96 | <0.01 |
| Uncoated Reference | 9.99 | <0.01 |
| Sample 57a | 10.06 | <0.01 |
| Sample 57b | 10.04 | <0.01 |
| Sample 76a | 10.04 | <0.01 |
| Sample 76b | 10.02 | <0.01 |

Monolithic Leach Test

Leach Test Based on Those Described in EA NEN 7375:2004

The sample size tested was 5×5 cm. The sample was placed coated side up in a sealable container (Sistema 'Klip It' 200 ml~10×6.5 cm). 50 ml de-ionised water was used as the leachant, the same amount of water was replaced after each completed leach period. The copper was analysed by ICP-OES (Thermo iCAP 7400). Testing was completed in duplicate on Sample 58 (1000 ppm copper roller coated sample with 200° C. cure), Sample 77 (1000 ppm copper roller coated sample with 200° C. cure followed by 650° C.), Sample 41 (8500 ppm copper spin coated sample with 200° C. cure) and Sample 41 (85000 ppm copper spin coated sample with 200° C. cure followed by 650° C.).

TABLE 40

Results of Monolithic leach test

| | Copper Detected (ppm) | | | | | | | |
|---|---|---|---|---|---|---|---|---|
| | Period 1 | Period 2 | Period 3 | Period 4 | Period 5 | Period 6 | Period 7 | Period 8 |
| Total Leach Time (days) | 0.25 | 1 | 2.25 | 4 | 9 | 16 | 36 | 64 |

TABLE 40-continued

Results of Monolithic leach test

Copper Detected (ppm)

| | Period 1 | Period 2 | Period 3 | Period 4 | Period 5 | Period 6 | Period 7 | Period 8 |
|---|---|---|---|---|---|---|---|---|
| Blank | <0.01 | <0.01 | <0.01 | <0.01 | <0.01 | <0.01 | <0.01 | <0.01 |
| Sample 58a | 0.04 | 0.03 | 0.01 | 0.01 | <0.01 | <0.01 | 0.04 | <0.01 |
| Sample 58b | 0.05 | 0.03 | 0.01 | <0.01 | <0.01 | <0.01 | 0.02 | <0.01 |
| Sample 77a | <0.01 | 0.02 | <0.01 | <0.01 | 0.01 | <0.01 | <0.01 | <0.01 |
| Sample 77b | <0.01 | <0.01 | <0.01 | 0.01 | 0.01 | <0.01 | <0.01 | <0.01 |
| Sample 41a | 0.32 | 0.54 | 0.98 | 1.13 | 2.26 | 2.19 | 1.16 | 0.28 |
| Sample 41a | 0.31 | 0.50 | 0.94 | 1.10 | 2.15 | 2.01 | 0.95 | 0.18 |
| Sample 41b | 0.08 | 0.14 | 0.32 | 0.36 | 0.57 | 0.59 | 0.80 | 0.77 |
| Sample 41b | 0.09 | 0.14 | 0.32 | 0.36 | 0.56 | 0.64 | 0.83 | 0.73 |

Figure 10:
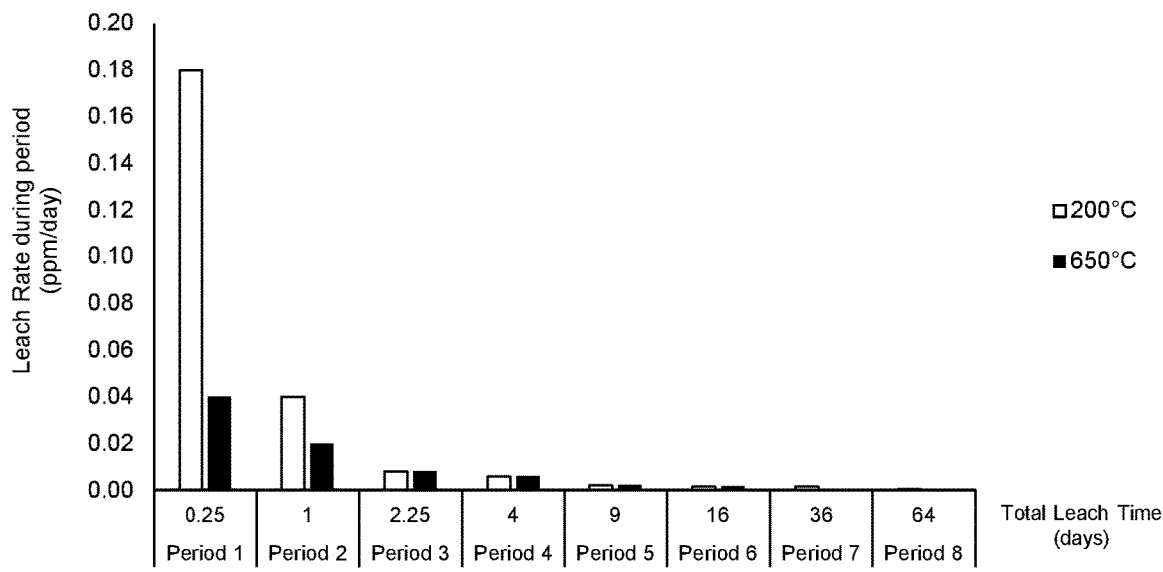
FIG. 10—demonstrates the leaching of copper particles from roller coated samples with 1000 ppm copper over time.
Figure 11:
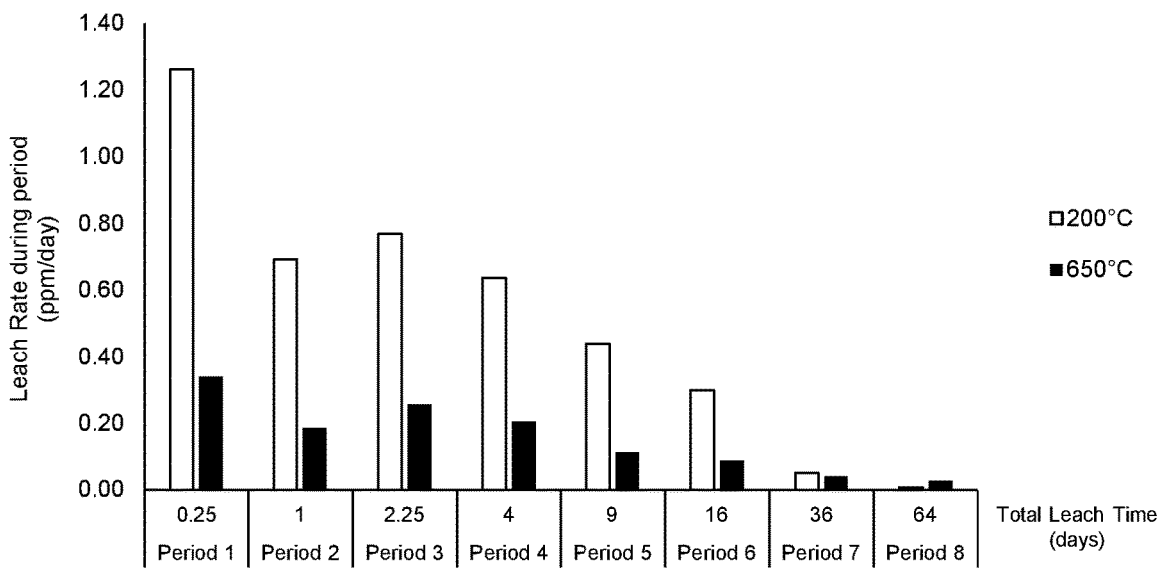
FIG. 11—demonstrates the leaching of copper particles from roller coated samples with 8500 ppm copper over time.

FIG. 10 and FIG. 11 illustrate the difference in leach rates across the eight time periods and compare the effect of the 650° C. heat treatments. The leach rate gradually decreases over time and drops dramatically after the 650° C. treatment for both the spin coated and roller coated samples.

Summary

Therefore, in relation to the present invention and as exemplified in the studies above, it has been demonstrated that a coating of copper particles in or on a silica matrix coating layer derived for example from TEOS and deposited onto a glass substrate, is able to destroy pathogens through surface contact.

More specifically, the inventors have demonstrated that by using a coating process according to the present invention, it is possible to prepare a cost effective, coated glass substrate which not only provides effective resistance against microbes such as the bacteria Methicillin-resistant *Staphylococcus aureus* (MRSA) and *Escherichia coli* (*E. coli*), but which is also able to meet the demanding test requirements of the glazing industry and therefore may be used in a range of glass substrate applications.

Whilst not wishing to be bound by any particular theory it is considered that the copper particles possibly affect both cell walls and internal proteins of the pathogens, with only a relatively small amount of copper embedded in and/or above the silica coating is required to produce the antimicrobial effect.

The silica matrix with copper particles is also able to provide additional benefits in terms of an increased abrasion resistance and chemical resistance and further provides an excellent aesthetic appearance.

The invention claimed is:

1. A process for producing an antimicrobial coating on a glass substrate, the process comprising the steps of:
 i) providing a glass substrate having a first surface and a second surface;
 ii) providing a silicon containing solution and a particle containing solution which comprises particles;
 iii) mixing together the silicon containing solution and the particle containing solution to form a silica coating composition;
 iv) contacting at least said first surface of the substrate with the silica coating composition to deposit a layer of the silica coating composition on the glass substrate; and
 v) curing the silica coating composition deposited on the glass substrate to form a silica matrix coating layer, wherein the particles are deposited on and/or within the silica matrix coating layer in an amount of from 0.1 to 20% by weight, resulting in an antimicrobial coated glass substrate;
 wherein the silica coating composition further comprises at least 1.0% by weight aluminium relative to the amount of silica in the silica matrix coating layer;
 wherein the particle containing solution comprises metal particles and/or metal agglomerates, and the metal particles and/or metal agglomerates comprise copper; and
 wherein the antimicrobial coated glass substrate provides at least a 2 log reduction against gram positive and/or gram negative bacteria within 2 hours at 37° C.

2. The process according to claim 1, wherein the metal particles comprise a size range of from 10 nm to 150 nm, and wherein the metal agglomerates comprise a size range of from 1 μm to 4 μm.

3. The process according to claim 1, wherein the silicon containing solution and the particle containing solution each comprise a solvent.

4. The process according to claim 3, wherein the solvent is selected from the group consisting of: ethanol, methanol, isopropyl alcohol, diacetone alcohol, 1-methoxy 2-propoanol (PGME), propylene glycol, methyl isobutyl ketone (MIBK) and mixtures thereof.

5. The process according to claim 1, wherein the silica coating composition comprises at least 65% by weight silica.

6. The process according to claim 1, wherein the silica matrix coating layer is based on: a polysilazane of formula:

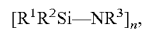

wherein $R^1$, $R^2$, and $R^3$ are each independently selected from H or $C_1$ to $C_4$ alkyl, and n is an integer; or
 tetraethyl orthosilicate, (TEOS).

7. The process according to claim 1, wherein the silica coating composition is applied directly in contact with the glass substrate.

8. The process according to claim 1, wherein the aluminium is present in or on the silica matrix coating layer in the form of an oxide of aluminium.

9. The process according to claim 1, wherein the silica coating composition is applied to the glass substrate by means of one or more of: dip coating; spin coating; curtain coating; roller coating; spray coating; air atomisation spraying; ultrasonic spraying; or slot-die coating.

10. The process according to claim 9, wherein the silica coating composition is applied to the glass substrate by roller coating or spray coating.

11. The process according to claim 1, further comprising the step of cleaning the surface of the glass substrate before applying the silica coating composition.

12. The process according to claim 11, wherein cleaning comprises the step of treating the surface of the glass substrate by one or more of: abrasion with ceria; washing with alkaline aqueous solution; rinsing with deionised water; and/or plasma treatment.

13. The process according to claim 1, wherein curing the silica coating composition comprises irradiating the glass substrate with applied silica coating composition with ultraviolet radiation and/or heating to a temperature in the range 90° C. to 450° C.

14. The process according to claim 1, wherein curing the silica coating composition comprises heating the glass substrate and silica coating composition to a temperature in the range 90° C. to 250° C.

15. The process according to claim 1, wherein the silica matrix coating layer is deposited to a thickness in the range 5 nm to 200 nm.

16. The process according to claim 1, wherein a transparent conductive oxide coating is applied to the glass substrate before deposition of the silica coating composition.

17. The process according to claim 1, wherein the glass substrate is an architectural or automotive glazing.

* * * * *